(12) United States Patent
Mancinelli et al.

(10) Patent No.: US 12,280,620 B2
(45) Date of Patent: Apr. 22, 2025

(54) SYSTEM FOR MEASURING THE LENGTH OF A FOOTPRINT OF A TYRE AND METHOD THEREOF

(71) Applicant: TRELLEBORG WHEEL SYSTEMS ITALIA S.P.A., Tivoli (IT)

(72) Inventors: Piero Mancinelli, Pescara (IT); Andrea Evangelisti, Villa Adriana-Tivoli (IT); Enrico Pieralice, Villa Adriana-Tivoli (IT)

(73) Assignee: TRELLEBORG WHEEL SYSTEMS ITALIA S.P.A., Tivoli (IT)

( * ) Notice: Subject to any disclaimer, the term of this patent is extended or adjusted under 35 U.S.C. 154(b) by 371 days.

(21) Appl. No.: 17/756,028

(22) PCT Filed: Nov. 11, 2020

(86) PCT No.: PCT/IT2020/050272
§ 371 (c)(1),
(2) Date: May 13, 2022

(87) PCT Pub. No.: WO2021/095074
PCT Pub. Date: May 20, 2021

(65) Prior Publication Data
US 2022/0402314 A1 Dec. 22, 2022

(30) Foreign Application Priority Data
Nov. 14, 2019 (IT) .................. 102019000021159

(51) Int. Cl.
*B60C 23/06* (2006.01)
*B60C 19/00* (2006.01)

(52) U.S. Cl.
CPC ............ *B60C 23/064* (2013.01); *B60C 19/00* (2013.01); *B60C 2019/004* (2013.01)

(58) Field of Classification Search
CPC .. B60C 23/064; B60C 19/00; B60C 2019/004
See application file for complete search history.

(56) References Cited

U.S. PATENT DOCUMENTS

| 9,815,344 | B2 | 11/2017 | Lin | |
|---|---|---|---|---|
| 2002/0166371 | A1* | 11/2002 | Ratti | ................. B60C 23/06 73/146 |

(Continued)

FOREIGN PATENT DOCUMENTS

| CN | 1396067 A | 2/2003 |
|---|---|---|
| CN | 101596916 A | 12/2009 |

(Continued)

OTHER PUBLICATIONS

International Search Report and Written Opinion issued on Mar. 18, 2021, in counterpart International Patent Application No. PCT/IT2020/050272 (9 pages, in English).

(Continued)

*Primary Examiner* — Lisa M Caputo
*Assistant Examiner* — Cynthia L Davis
(74) *Attorney, Agent, or Firm* — Bookoff McAndrews, PLLC

(57) ABSTRACT

The present invention relates to a system and method for measuring the length of a footprint of a tyre (10).
The system comprises a first electronic device (1) and a second electronic device (2), each of which is configured at least to acquire, filter, store and sent data, and a processing unit (3), external to said electronic devices (1, 2), configured at least to receive and process the data sent by each electronic device (1, 2), to measure the length of a footprint on the basis of an angle (β) arranged between a first axis (B1) passing through the centre (O) of the tyre (10) and a first contact point (CP1) between a portion of said tyre (10) and the ground and a second axis (B2) passing through the centre (Continued)

of the tyre (10) and a second contact point (CP2) between said portion of said tyre (10) and the ground.

18 Claims, 10 Drawing Sheets

(56) References Cited

U.S. PATENT DOCUMENTS

| | | | | |
|---|---|---|---|---|
| 2003/0046992 | A1* | 3/2003 | Caretta | B60C 23/0413 |
| | | | | 73/146 |
| 2007/0010928 | A1* | 1/2007 | Brusarosco | G01G 19/025 |
| | | | | 340/444 |
| 2007/0107505 | A1* | 5/2007 | Schillinger | B60C 23/0411 |
| | | | | 73/146 |
| 2010/0324858 | A1* | 12/2010 | Pannek | B60C 23/0488 |
| | | | | 73/146 |
| 2014/0005956 | A1 | 1/2014 | Patel et al. | |
| 2019/0118591 | A1* | 4/2019 | Kollmitzer | B60C 23/061 |
| 2020/0231010 | A1* | 7/2020 | Carpenter | G07C 5/006 |

FOREIGN PATENT DOCUMENTS

| | | |
|---|---|---|
| CN | 108369240 A | 8/2018 |
| EP | 2679411 A2 | 1/2014 |
| FR | 3042281 A1 | 4/2017 |
| JP | 2012218682 A | 11/2012 |
| RU | 2676511 C2 | 12/2018 |

OTHER PUBLICATIONS

Federal Institute of Industrial Property (FIPS) Search Report issued in corresponding Russian Application No. 2022115169, dated Jan. 31, 2024 (4 pages with English translation).

Search Report issued in corresponding Chinese Application No. 202080070908.3, dated Jan. 4, 2024 (8 pages with English translation).

* cited by examiner $L = 2R_0 \sin(\beta/2)$

SYSTEM FOR MEASURING THE LENGTH OF A FOOTPRINT OF A TYRE AND METHOD THEREOF

FIELD OF THE INVENTION

The present invention relates to a system for measuring the length of the footprint of a tyre.

In particular, the present invention relates to a structure of a system configured for measuring the length of a vehicle (particularly an agricultural vehicle), when the tyre is in use, on the basis of a chord subtending an angle arranged between an axis passing through the centre of the tyre and a first contact point between a portion of said tyre and the ground, and a second axis passing through the centre of a tyre and a second contact point between said portion of said tyre and the ground, beyond which said portion of said tyre loses contact with the ground.

The system comprises at least a first electronic device, applied in use on the inner surface or outer surface of the tyre and a processing unit, external to said at least first electronic device.

Preferably, said system further comprises a second electronic device, applied on the rim, and each electronic device is configured at least to acquire, filter, store data and sent said data to the processing unit, and said processing unit is configured at least to acquire said data and process said data in order to measure the footprint of the tyre.

The expression "footprint" refers to a contact surface between the tyre and the ground.

Said contact surface is a reduced surface with respect to the overall dimensions of the tyre.

The present invention also relates to a method for measuring the length of the footprint of a tyre on the ground.

BACKGROUND OF THE INVENTION

As is known, the shape of the footprint of a tyre is defined by a length (i.e., the longitudinal dimension of the footprint) and a width (i.e., the transverse dimension of the footprint).

With the same load acting on a tyre, the length of the footprint of said tyre varies according to the pressure with which the tyre is inflated:
  i. if the tyre pressure is high, the length of the footprint of the tyre on the ground is reduced (in other words, the deflection of the tyre on the ground is limited),
  ii. if the tyre pressure is low, the length of the footprint of the tyre on the ground is greater than the length of the footprint in the situation above described (in other words the deflection of the tyre on the ground is high).

FIGS. 1A and 1B respectively show a tyre of an agricultural vehicle and its footprint when the pressure of said tyre is high.

FIGS. 1C and 1D respectively show a tyre of an agricultural vehicle and its footprint when the pressure of said tyre is low.

Factors such as traction, soil compaction and fuel consumption per unit of surface that is treated by an agricultural vehicle depend on the footprint of the agricultural vehicle.

Currently a system capable of measuring the length of a contact area between a tyre and the ground is known and described in the patent application WO 2019/101849 A1.

Said system comprises a monitoring unit associated with the tyre, in which said monitoring unit comprises a sensor for measuring at least a descriptive quantity of the deformations of the tyre in use.

In particular, during the rotation of the tyre, said quantity is measured within a certain time at a sampling frequency. For each measurement of said quantity, the system is capable of determining if the measured quantity has a value representative of a passage of the monitoring unit in correspondence with said contact area, so as to obtain a first number of passages of the monitoring unit in correspondence with the contact area within a time interval.

A parameter is estimated on the basis of the value of said number, of said sampling frequency and of said time interval and the monitoring of the tyre is based on said estimated parameter.

The measurement of the length of said contact area is based on a statistical approach, in particular on the probability "p" that the monitoring unit is positioned in correspondence of the contact area during the rotation of the tyre.

The greater the value of said parameter the greater the time that said monitoring unit is positioned in correspondence with said contact area within the time interval and therefore the greater the probability of finding the monitoring unit in correspondence of the contact area during rotation of the tyre.

For example, this probability "p" can be equal to the ratio between the number of measurements representing the passages of the monitoring unit in correspondence with the contact area and the number of measurements, according to the following formula:

$$PL=2\pi Rp$$

wherein R is the radius of the tyre.

However, said known type system has a disadvantage due to the fact that it is not able to calculate the length of the footprint with high precision since the presence of the sensor in the footprint zone is not certain but is described by a probability.

Other systems for measuring the length of the footprint of a tyre are disclosed, for example, in documents JP 2012-218682 A, EP 2679411 A2 and FR 3042281 A1.

SUMMARY OF THE INVENTION

Aim of the present invention is to overcome said disadvantage, providing a system and a method for measuring the length of the footprint of a tyre of a vehicle on the ground, particularly an agricultural vehicle, so as to evaluate how this length varies according to the pressure of the tyre and/or the load acting on said tyre.

It is therefore object of the invention a system for measuring the length of a footprint of a tyre, comprising:
  a first electronic device to be positioned, in use, on the inner surface or on the outer surface of the tyre,
  a second electronic device, to be positioned, in use, in contact with the rim, on which said tyre is mounted,
  a processing unit 3, external to said electronic devices,
wherein:
  a first reference system $x_1$, $y_1$, $z_1$ is associated with the first electronic device in such a way that the axis $x_1$ is tangent to the rotation of a first point which is a point of said tyre in which said first electronic device is applied, and the axis $z_1$ is perpendicular to said axis $x_1$,
  a second reference system $x_2$, $y_2$, $z_2$ is associated with the second electronic device in such a way that the axis $x_2$ is tangent to the rotation of a second point which is a point of said rim in which said second electronic device is applied, and the axis $z_2$ is perpendicular to said axis $x_2$.

Said first electronic device is configured at least to send data to said processing unit and comprises inside:
- a first inertial measurement unit comprising a first gyroscope and a first accelerometer, configured to acquire, by means of said first gyroscope, a plurality of values associated at least to the angular velocity around the y axis, or, by means of said first accelerometer, a plurality of values associated at least to the linear acceleration along the x axis or a plurality of values associated at least to the linear acceleration along z axis,
- first storage means for storing data,
- a first logic control unit, connected with said first inertial measurement and to said first storage means, and configured to:
  - receive from said first inertial measurement unit:
    - each value of said linear acceleration along the x axis, or
    - each value of said linear acceleration along the z axis, or
    - each value of said angular velocity around the y axis,
  - filter by means of a first digital filter:
    - each value of said linear acceleration along the x axis to obtain a filtered linear acceleration along the x axis, or
    - each value of said linear acceleration along the z axis to obtain a filtered linear acceleration along the z axis, or
    - each value of said angular velocity around the y axis to obtain a filtered linear angular velocity around the y axis,
  - identify a first time instant in correspondence of a first contact point between a portion of said tyre and the ground, when said portion of said tyre comes into contact with the ground, and a second time instant, in correspondence of a second contact point between said portion of said tyre and the ground, beyond which said portion of said tyre loses contact with the ground; where said first time instant and said second time instant are respectively:
    - the initial time instant and the final time instant of a discontinuity portion of a sinusoid associated with said filtered linear acceleration along the x axis, or
    - the initial time instant and the final time instant of a discontinuity portion of a sinusoid associated with said filtered linear acceleration along the z axis, or
    - the initial time instant and the final time instant of a discontinuity portion of a sinusoid associated with said filtered angular velocity around the y axis,
  - calculate the time interval between said first time instant and said second time instant,
  - store said first time instant, said second time instant and said time interval in said first storage means,
  - send said first time instant, said second time instant and said time interval to said processing unit.

Said second electronic device is configured at least to send data to said processing data and comprises inside:
- a second inertial measurement unit comprising a second gyroscope, configured to acquire, by means of said second gyroscope, a plurality of values associated at least to the angular velocity around the y axis,
- second storage means for storing data,
- a second logic control unit, connected to said second inertial measurement unit and to said second storage means, and configured to:
  - receive from the second inertial measurement unit the values of said angular velocity around the y axis,
  - filter by means of a second digital filter each value of said angular velocity around the axis y to obtain a respective filtered angular velocity around the y axis,
  - identify a respective time instant $t_{2y}'$ associated with each value of said filtered angular velocity around the y axis,
  - store in predetermined time intervals in said second storage means each value of said filtered angular velocity around the y axis and the respective time instant $t_{2y}'$,
  - send to said processing unit each value of said filtered angular velocity around the y axis and the respective time instant $t_{2y}'$.

Said processing unit is configured at least to receive data from said first electronic device and from said second electronic device and comprises inside:
- third storage means for storing data,
- a third logic control unit, connected to said third storage means, and configured to:
  - receive said first time instant, said second time instant and said time interval from said first electronic device,
  - receive the values of said filtered angular velocity around the y axis sent by said second electronic device, as well as the respective time instants $t_{2y}'$,
  - calculate the mean value of the filtered angular velocities around the y axis associated with said second electronic device in correspondence of each instant of time $t_{2y}'$ within said time interval,
  - calculate an angle between a first axis passing through the centre of the tyre and said first contact point and a second axis passing through the centre of the tyre and said second contact point, according to the following formula:

$$\beta = \overline{\omega}'_{2y} \cdot \Delta t_D,$$

- calculate the length of the footprint of the tyre with the following formula:

$$L = 2 \cdot R_0 \cdot \sin\frac{\beta}{2}$$

wherein $R_0$ is the rolling radius of the tyre.

Further preferred embodiments of the system are disclosed in the dependent claims.

The present invention relates also to a method for measuring the length of a footprint of a tyre, by means of the system above mentioned.

Said method comprises the following steps:
A) acquiring:
- a plurality of values associated with the linear acceleration along the x axis associated with a first electronic device, or
- a plurality of values associated with the linear acceleration along the z axis associated with a first electronic device, or
- a plurality of values associated with the angular velocity around the y axis associated with a first electronic device, B) Filtering:
- each value of said linear acceleration along the x axis to obtain a filtered linear acceleration along the x axis, or
- each value of said linear acceleration along the z axis to obtain a filtered linear acceleration along the z axis, or each value of said angular velocity around the y axis to obtain a filtered angular velocity around the y axis, C) identifying a first time instant, at a first contact point between a portion of said tyre and the ground, when said portion of said tyre comes into contact with the ground, and a second time instant, at a second contact point between said portion of said tyre and the ground, beyond which said portion of said tyre loses contact with the ground; where said first time instant and said second time instant are respectively:

the initial time instant and the final time instant of a discontinuity portion of a sinusoid associated with said filtered linear acceleration along the x axis, or the initial time instant and the final time instant of a discontinuity portion of a sinusoid associated with said filtered linear acceleration along the z axis, or the initial time instant and the final time instant of a discontinuity portion of a sinusoid associated with said filtered angular velocity around the y axis, D) calculating the time interval between said first time instant and said second time instant, E) storing said first time instant, second time instant and said time interval, F) acquiring a plurality of values associated with at least said angular velocity around the y axis associated with the second electronic device, G) filtering each value of said angular velocity around the y axis to obtain a respective filtered angular velocity around the y axis, H) identifying a respective instant time $t_{2y}'$ associated with each value of said filtered angular velocity around the y axis, I) storing in predetermined time intervals each value of said filtered angular velocity around the y axis and the respective time instant $t_{2y}'$, J) calculating the mean value of the filtered angular velocities around the y axis associated with said second electronic device in correspondence of each time instant $t_{2y}'$ within said time interval, K) calculating an angle arranged between a first axis passing through the centre of the tyre and a first contact point, and a second axis, passing through the centre of the tyre and a second contact point, according to the following formula:

$\beta = \overline{\omega}'_{2y} \cdot \Delta t_D$,

L) calculating the length of the footprint of the tyre with the following formula:

$$L = 2 \cdot R_0 \cdot \sin\frac{\beta}{2}$$

wherein $R_0$ is the rolling radius of the tyre.

BRIEF DESCRIPTION OF THE DRAWINGS

The present invention will be now described, for illustrative, but not limitative purposes, according to its embodiment, making particular reference to the enclosed figures, wherein.

DETAILED DESCRIPTION OF THE INVENTION

Figure 1A:
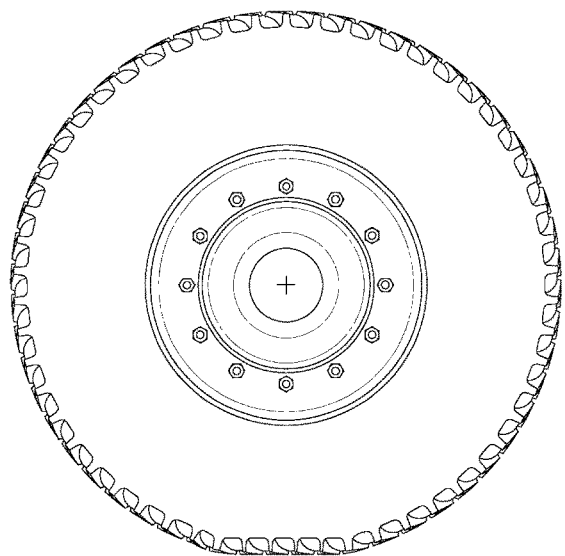
FIGS. 1A and 1B respectively show a tyre of an agricultural vehicle and its footprint when the pressure of the tyre is high.
Figure 1C:
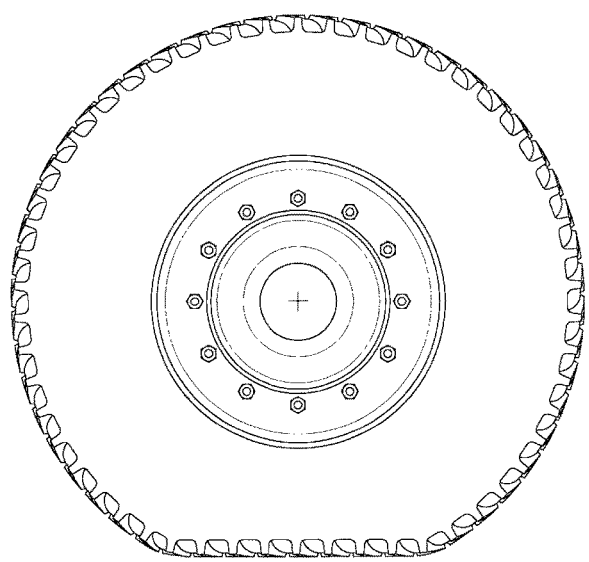
FIGS. 1C and 1C respectively show a tyre of an agricultural vehicle and its footprint when the pressure of the tyre is low.
Figure 1B:
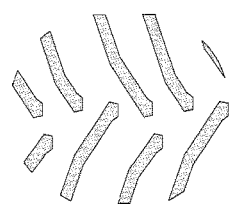
Figure 1D:
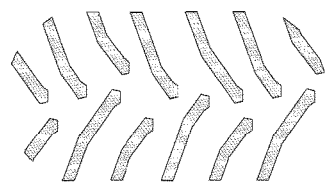
Figure 2:
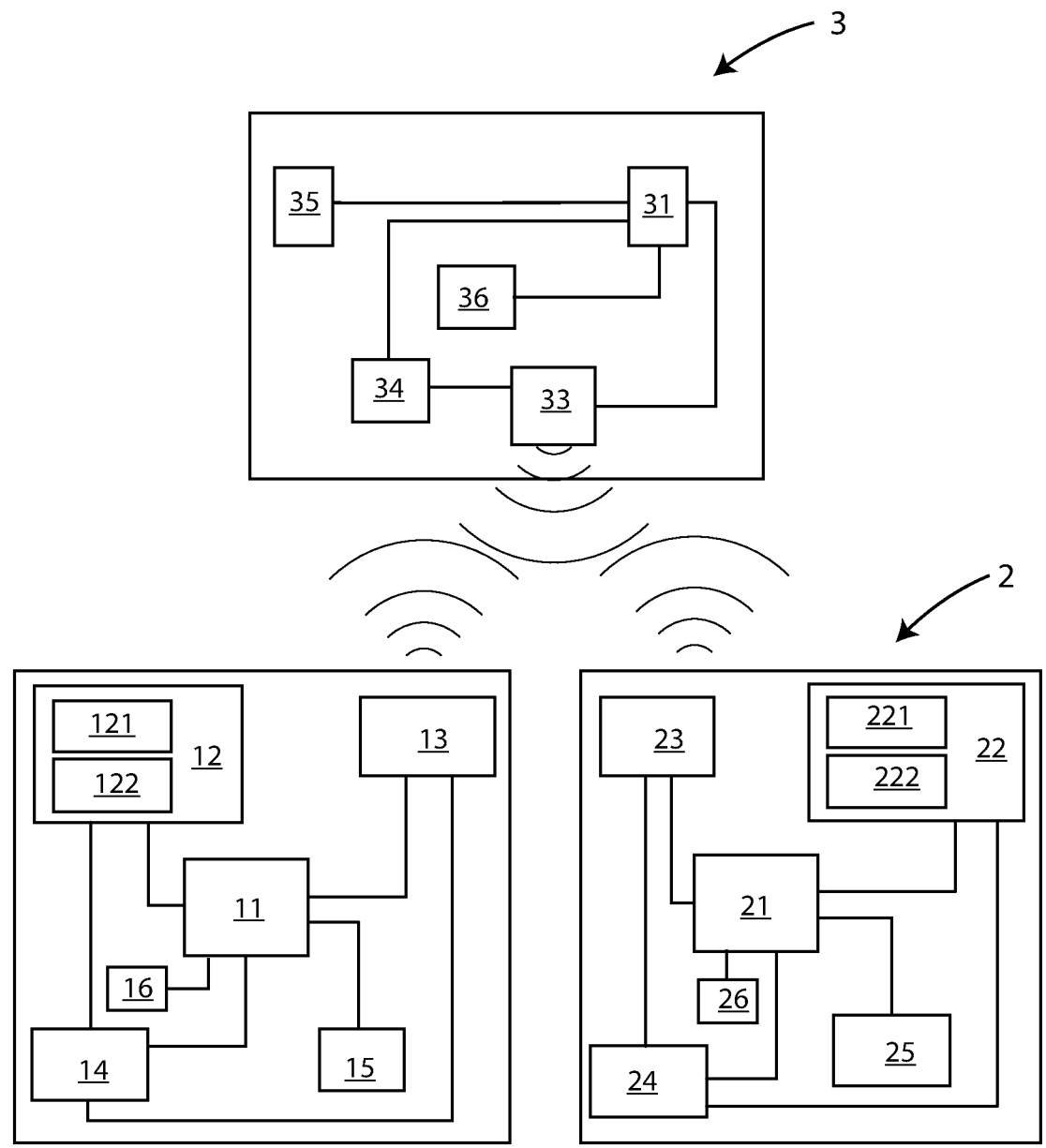
FIG. 2 is a schematic view of the components of a first embodiment of the system, object of the invention, comprising a first electronic device, a second electronic device and a processing unit, external to said electronic devices, in which the length of the footprint is calculated on the basis of the information relating to the linear acceleration around the x axis associated with the first electronic device.
Figure 3A:
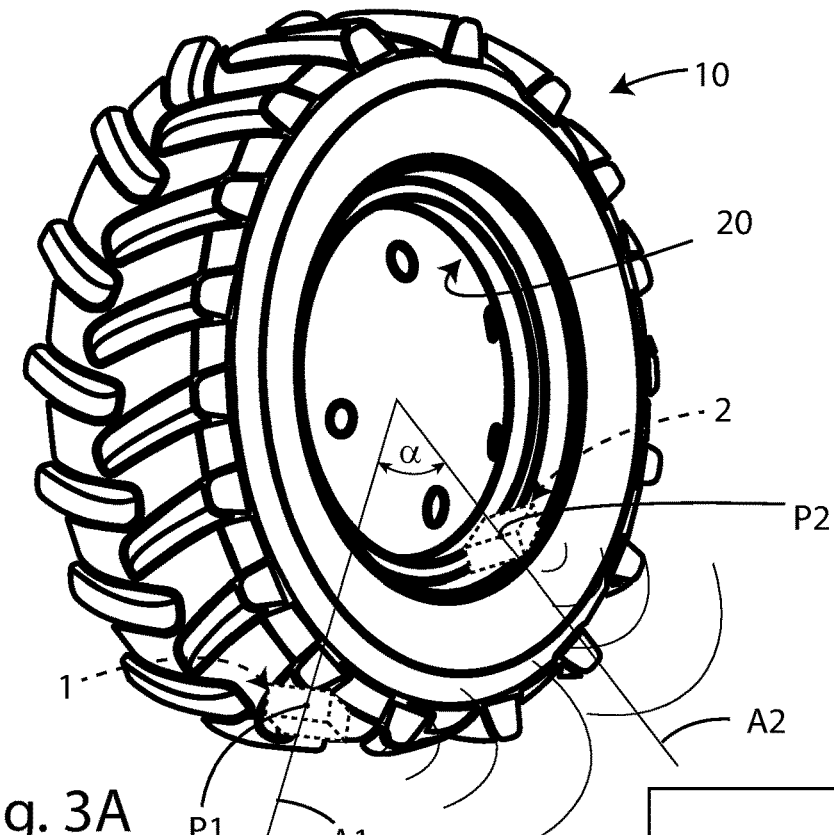
FIG. 3A is a perspective view of a wheel comprising a tyre and a rim, on which the tyre is mounted, showing the first electronic device, arranged inside the tyre so as to contact the inner surface of the tyre itself, the second electronic device, arranged on the channel of said rim, and a processing unit.
Figure 3B:
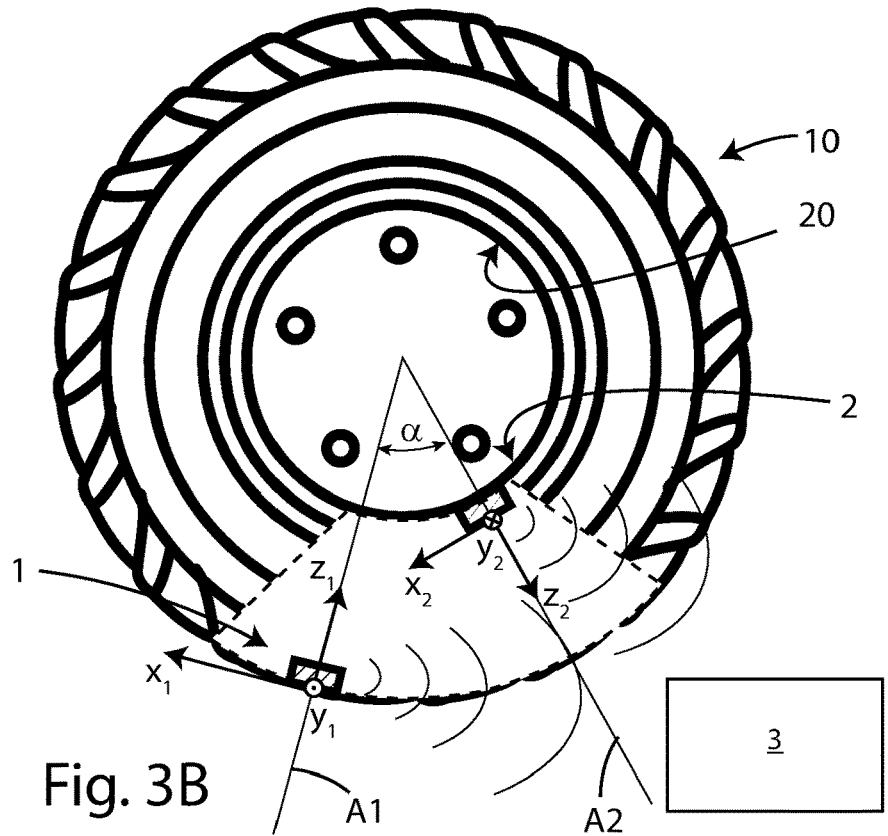
FIG. 3B is a side view of the wheel of FIG. 2A.
Figure 3C:
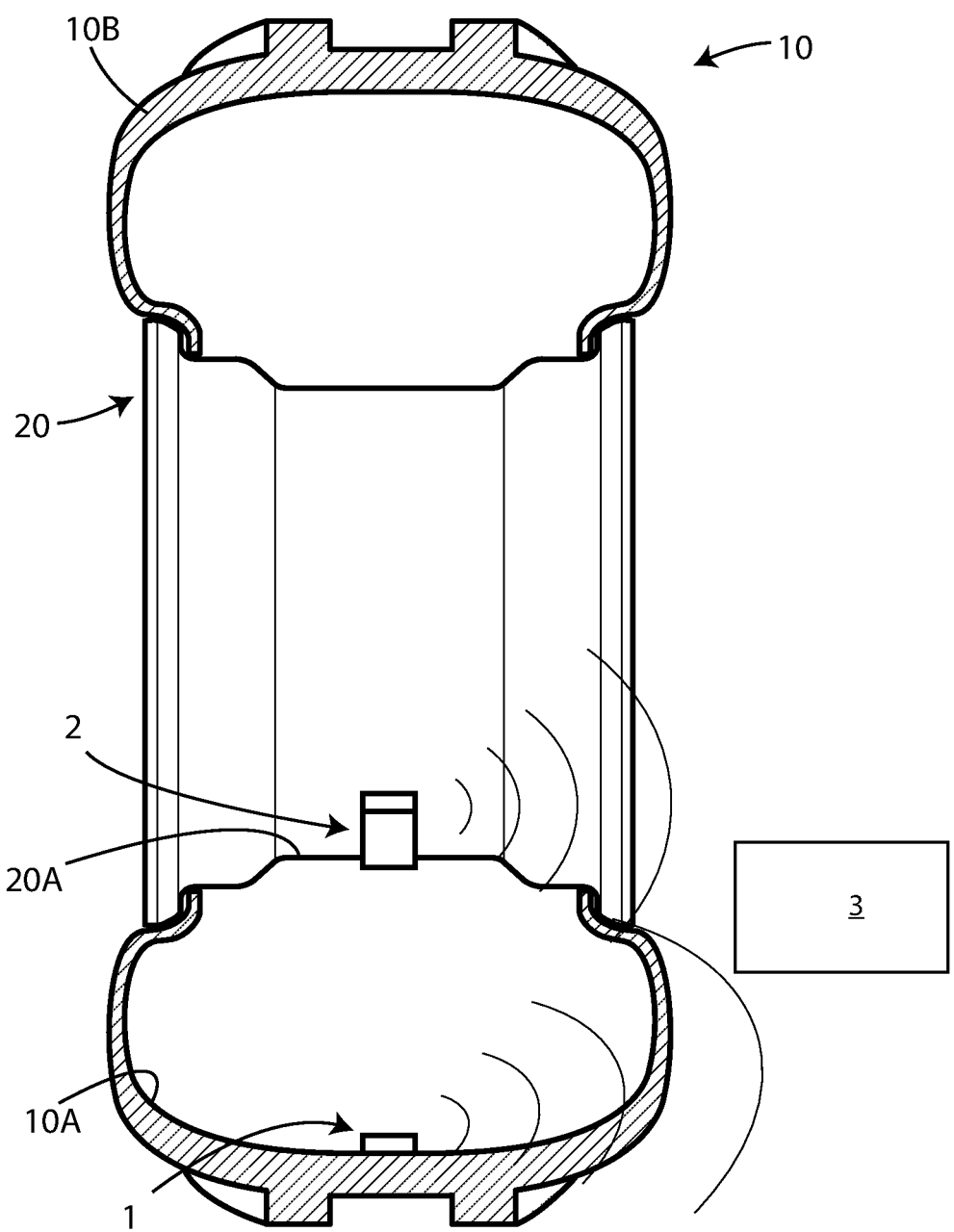
FIG. 3C is a front view of the wheel of FIG. 2A.

With reference to FIGS. 2-6 a first embodiment of the system for measuring the length of the footprint of a tyre 10. Said system comprises:

a first electronic device 1, to be positioned, in use, on the inner surface 10A or on the outer surface 10B of the tyre 10, a second electronic device 2, to be positioned, in use, in contact with the rim 20, in particular, in the embodiment being disclosed, on a channel 20A of the rim 20, on which said tyre 10) is mounted, and a processing unit 3, external to said electronic devices 1, 2.

In the embodiment being disclosed, a first reference system $x_1$, $y_1$, $z_1$ is associated with the first electronic device 1 in such a way that the axis $x_1$ is tangent to the rotation of a first point P1 which is a point of the tyre 10 in which said first electronic device 1 is applied, and the axis $z_1$ is perpendicular to said axis $x_1$, and a second reference system $x_2$, $y_2$, $z_2$ is associated with the second electronic device 2 in such a way that the axis $x_2$ is tangent to the rotation of a second point P2 which is a point of said rim 20 in which said second electronic device 2 is applied, and the axis $z_2$ is perpendicular to said axis $x_2$.

The angle between the first axis A1 and the second axis A2 is indicated with $\alpha$.

The axis $x_1$ and the axis $z_1$ of the first reference system are positioned on a same first plane.

The axis $x_2$ and the axis $z_2$ of the second reference system are positioned on a same second plane.

In the embodiment being disclosed, said second plane is parallel or substantially parallel to said first plane.

However, although not shown in Figures said first plane and said second plane can coincide.

Furthermore, in the embodiment being disclosed, said first electronic device 1 is arranged on the inner surface 10A of the tyre 10.

However, said first electronic device can be arranged on the outer surface 10B of the tyre 10, without departing from the scope of the invention.

Figure 6:
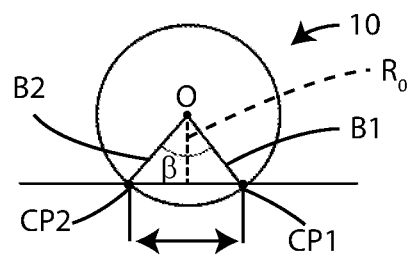
FIG. 6 is a schematic view showing a tyre represented by a circumference and the length of the footprint of said tyre substantially equal to the length of a chord subtending an angle arranged between a first axis, passing through the centre of the tyre and a first point of contact between a portion of said tyre and the ground, and a second axis, passing through the centre of the tyre and a second point of contact between said portion of said tyre and the ground, beyond which said portion of said tyre loses its contact with the ground.

The length of the footprint of the tyre 10 is calculated on the basis of an angle $\beta$ arranged between a first axis B1 passing through the centre O of the tyre 10 and a first point of contact CP1 between a portion of said tyre 10 and the ground, when said portion of said tyre 10 comes into contact with the ground, and a second axis B2 passing through the centre of the tyre and a second point of contact CP2 between said portion of said tyre 10 and the ground, beyond which said portion of said tyre 10 loses contact with the ground (said contact points are shown in FIG. 6).

In particular, the length of the footprint of the tyre is substantially defined by the chord that subtends said angle, in which said chord is the chord arranged within a circumference that represents the tyre.

With reference to the first electronic device 1, said first electronic device 1 comprises inside:

first supplying power means 14 for supplying power to said first electronic device 1, a first wireless transceiver module 13 for transmitting and receiving signals/data to/from said processing unit 3, a first inertial measurement unit 12, comprising a first accelerometer 122, configured to:

acquire, by means of said first accelerometer 122, a plurality of values associated at least to the linear acceleration along the x axis $A_{1x}$, where, in the embodiment described, the value of said first linear acceleration along the x axis $A_{1x}$ is a value normalized with respect to a unit value (i.e., the value of the first linear acceleration along the x axis $A_{1x}$ is between −1 and +1), first storage means 15 for storing data, a first logic control unit 11, connected with said first inertial measurement 12, to said first wireless transceiver module 13 and to said first storage means 15, and configured to:

receive from said first inertial measurement unit 12 of said first electronic device 1, the values of said linear acceleration along the x axis $A_{1x}$, filter by means of a first digital filter each value of said linear acceleration along the x axis $A_{1x}$ to obtain a respective filtered linear acceleration along the x axis $A_{1x}'$, identify a first time instant $t_{1,1D}$, in correspondence of a first contact point CP1 between a portion of said tyre 10 and the ground, when said portion of said tyre 10 comes into contact with the ground, and a second time instant $t_{1,2D}$, in correspondence of a second contact point CP2 between said portion of said tyre 10 and the ground, but beyond which said portion of said tyre 10 loses contact with the ground, calculate the time interval $\Delta t_D$ between said first time instant $t_{1,1D}$ and said second time instant $t_{1,2D}$, store said first time instant $t_{1,1D}$, said second time instant $t_{1,2D}$ and said time interval $\Delta t_D$ in said first storage means 15, send said first time instant $t_{1,1D}$, said second time instant $t_{1,2D}$ and said time interval $\Delta t_D$ to said processing unit 3.

In other words, the first contact point CP1 is the initial contact point between a portion of said tyre 10 and the ground and the second contact point CP2 is the final contact point between the same portion of said tyre 10 and the ground (beyond said second contact point CP2, said portion of said tyre 10 loses contact with the ground).

With reference to the first digital filter, in the embodiment being disclosed, said first digital filter is a first IIR filter (Infinite Impulse Response).

In particular, it is preferable that said first IIR filter has a frequency between 0.1 Hz e 1 Hz.

The first logic control unit 11 can be configured to send said time interval $\Delta t_D$ to the processing unit 3, when the tyre 10 has completed a predetermined first number of revolutions.

Advantageously, the transmission of data to the processing unit 3 by the first electronic device 1 after a predetermined first number of revolutions allows to obtain an energy saving.

With reference to the first inertial measurement unit, said first inertial measurement unit 12 comprises a first gyroscope 121 and is configured to:

acquire, through said first gyroscope 121, at least the angular velocity around the y axis $\omega_{1y}$, send said at least one angular velocity around the y axis $\omega_{1y}$ to said processing unit 3.

Figure 4A:
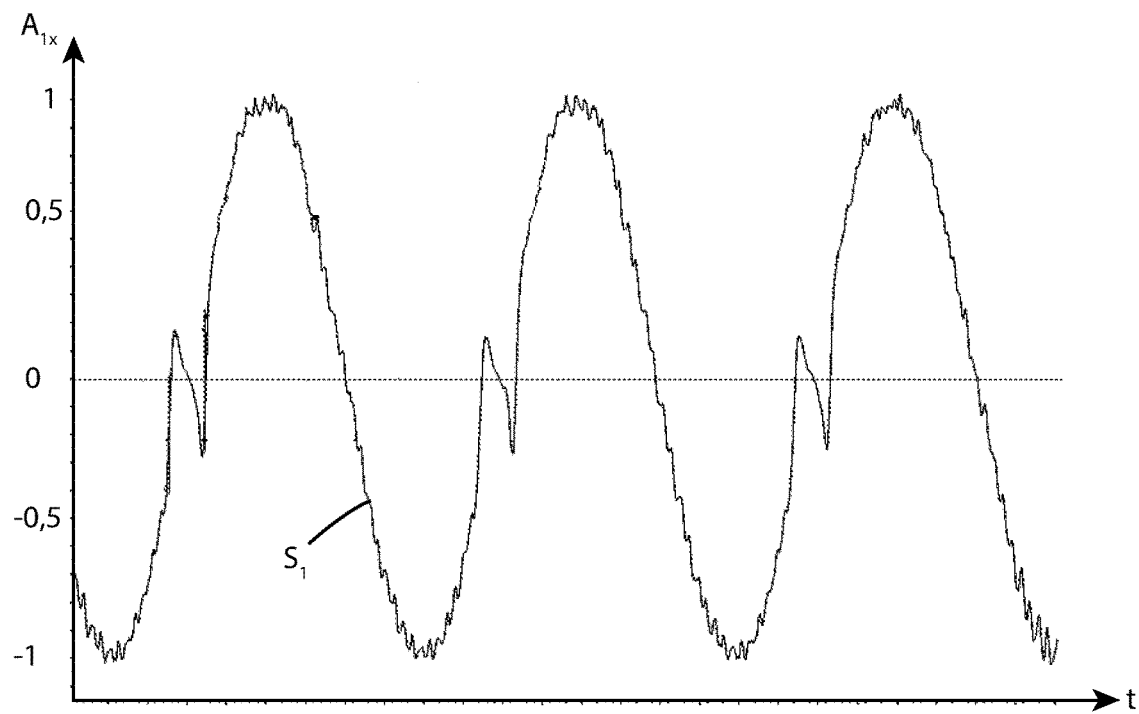
FIG. 4A shows on a Cartesian plane a sinusoid representing the linear acceleration along the x axis associated with the first electronic device, when the tyre is in use.

FIG. 4A shows a sinusoid S1 which represents the linear acceleration along the x axis $A_{1x}$ associated with the first electronic device 1 (i.e., the electronic device arranged on the inner surface 10A of the tyre 10).

Said sinusoid S1 shows how the linear acceleration along the x axis $A_{1x}$ associated with the first electronic device 1 varies over time.

As can be seen from FIG. 4A, the sinusoid S1 periodically has a discontinuity due to a respective portion of the tyre 10 which first comes into contact with the ground and subsequently loses contact with the ground.

The discontinuity is detected by means of the first electronic device 1 which is arranged on the inner surface 10A of the tyre 10.

Figure 4B:
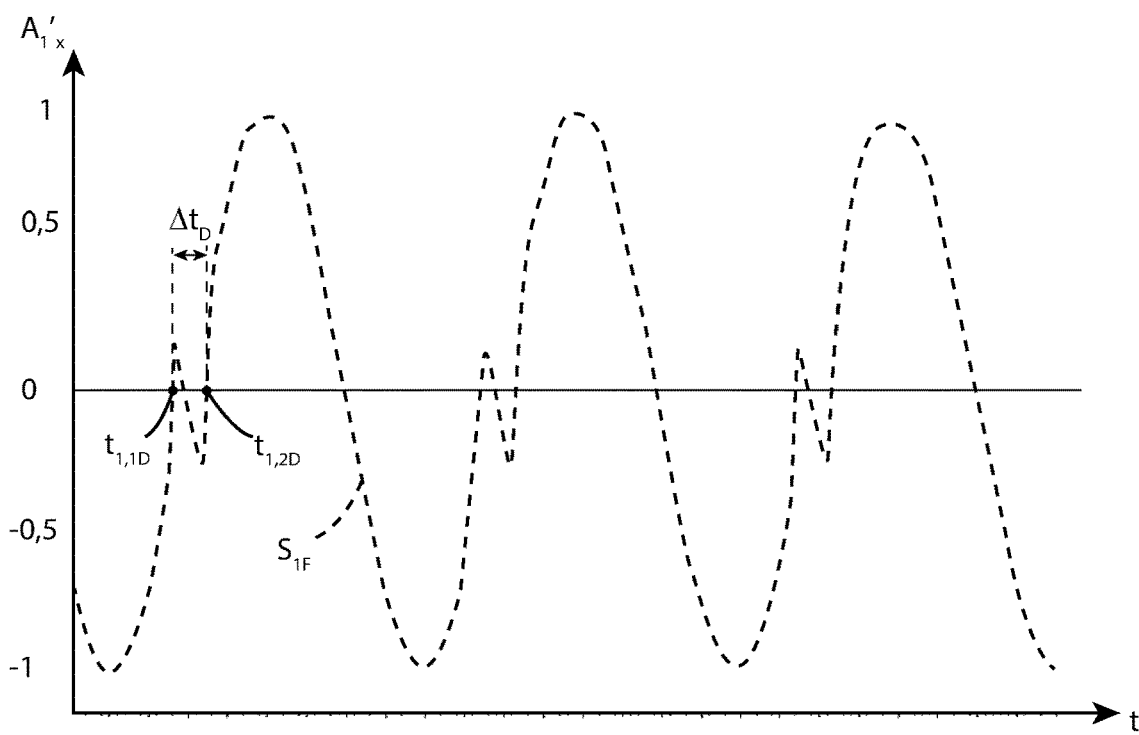
FIG. 4B shows on a Cartesian plane a sinusoid representing the linear acceleration along the x axis filtered by a first IIR filter, when the tyre is in use.
Figure 5A:
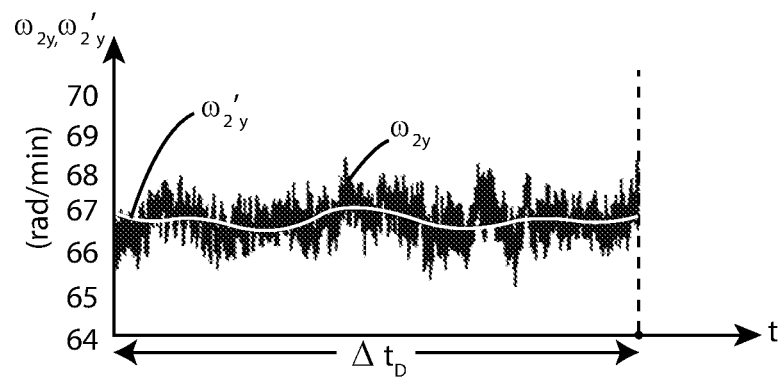
FIG. 5A shows the trend of two portions of angular velocity around the y axis, associated with the second electronic device, in a time interval $\Delta t_D$, respectively before and after the application of a second IIR filter, when the second electronic device is in use.
Figure 5B:
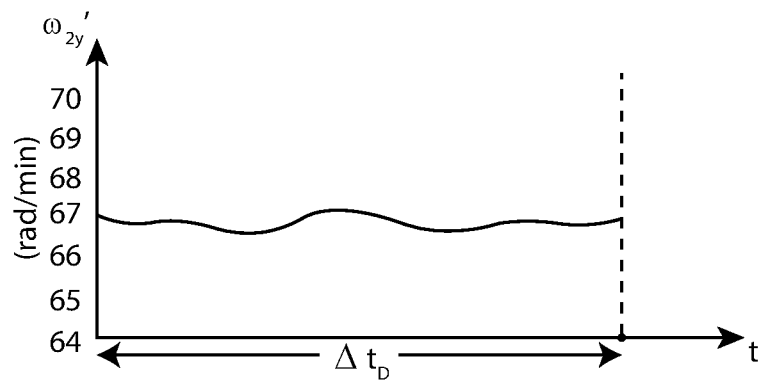
FIG. 5B shows on a Cartesian plane the trend of a portion of filtered angular velocity around the y axis, associated with the second electronic device, in said time interval $\Delta t_D$.

The sinusoid $S_{1F}$ filtered by the first IIR filter, shown in FIG. 4B, has the same discontinuity at a time interval $\Delta t_D$ although less pronounced than the sinusoid S1 (i.e., the sinusoid when the first IIR filter was not applied).

Consequently, the duration of this time interval $\Delta t_D$ is given by the time in which the portion of said tyre 10 contacts the ground and remains in contact with the ground until the same portion of said tyre loses contact with the ground.

In use, the tyre 10 performs a plurality of rotations.

With reference to the first electronic device 1, for each rotation of the tyre 10, two time instants are identified and stored: a first time instant $t_{1,1D}$ in which said portion of said tyre 10 comes into contact with the ground, and a second instant of time $t_{1,2D}$ in which said portion of said tyre 10 is still in contact with the ground, but beyond which said portion of said tyre 10 loses contact with the ground.

The rotational movement of the tyre 10 is represented by a sinusoid and the time instants correspond to the points where the sinusoid intercepts the abscissa axis of a Cartesian plane, in which said abscissa axis is the time and the ordinate axis is the linear acceleration along the x axis $A_{1x}$ associated with the first electronic device 1.

In the example that is described, said storage means 15 are external to the first control logic unit 11.

However, said first storage means 15 can be included in said first logic control unit 11, without departing from the scope of the invention.

With particular reference to the second electronic device 2, as already mentioned, in the embodiment being disclosed, said second electronic device 2 is arranged on a channel 20A of the rim 20.

However, said second electronic device 2 can be arranged on the rim 20 in any position, for example on the outer surface of the rim, i.e., the surface facing outwards, or even on the disc of the rim, without leaving the scope of the invention.

Said second electronic device 2 comprises inside:
second supplying power means 24 for supplying power to said second electronic device 2,
a second wireless transceiver module 23 for transmitting and receiving signals/data to/from said processing unit 3,
a second inertial measurement unit 22, comprising a second gyroscope 221, configured to:
acquire, through said second gyroscope 221, a plurality of values associated at least with the angular velocity around the y axis $\omega_{2y}$,
second storage means 25 for storing data,
a second logic control unit 21, connected to said second inertial measurement unit 22, to said second wireless transceiver module 23 and to said second storage means 25, and configured for:
receive from the second inertial measurement unit 22 the values of said angular velocity around the y axis $\omega_{2y}$,
filter each value of angular velocity around the y axis $\omega_{2y}$ by means of a second digital filter to obtain a respective angular velocity around the y axis filtered $\omega_{2y}'$,
identify a respective time instant $t_{2y}'$ associated with each value of said angular velocity around the y axis filtered $\omega_{2y}'$,
storing in predetermined time intervals in said second storage means 25 the values of said filtered angular velocity around the y axis $\omega_{2y}'$ and the respective time instants $t_{2y}'$,
transmit to said processing unit 3 the values of said filtered angular velocity around the filtered y axis $\omega_{2y}'$ and the respective time instants $t_{2y}'$.

With reference to the second digital filter, in the embodiment being disclosed, said second digital filter is a second IIR filter.

In particular, it is preferable that said second IIR filter has a frequency between 0.1 Hz and 1 Hz.

The storage step of the values of the filtered angular velocity around the y axis $\omega_{2y}'$ and the respective time instant $t_{2y}'$ can be performed in predetermined time intervals. Said predetermined time intervals can be chosen in such a way that the storage step is periodic.

With reference to the second inertial measurement unit 22, said second inertial measurement unit 22 comprises a second accelerometer 222 and is configured to:
acquire, through said second accelerometer 222, a plurality of values associated to at least linear acceleration along the x axis $A_{2x}$,
send the values of said linear acceleration along the x axis $A_{2x}$ to said processing unit 3.

The second logic control unit 21 can be configured to send to the processing unit 3 the values of filtered angular velocity around the y axis $\omega_{2y}'$ and the respective time instants $t_{2y}'$ associated with each value of filtered angular velocity value around the y axis $w_{2y}'$, when the tyre 10 has completed a predetermined second number of revolutions.

Advantageously, the transmission of data to the processing unit 3 by said second electronic device 2 after a predetermined second number of revolutions allows to obtain an energy saving.

With reference to the digital filters, in particular to the IIR filters mentioned above, these HR filters allow to eliminate the noise mainly due to vibrations, mechanical transmissions, and ground irregularities.

With reference to both electronic devices 1, 2 of the system, each electronic device 1, 2 is respectively fixed to the tyre 10 and to the rim 20 by means of a respective fixing device resistant to dust and water (not shown).

With particular reference to the processing unit 3, said processing unit 3 comprises inside:
third power supplying means 34 for supplying power to said processing unit 3,
a third wireless transceiver module 33 for transmitting and receiving signals/data to/from said first electronic device 1 and said second electronic device 2,
third storage means 35 for storing data,
a third logic control unit 31, connected to said third wireless transceiver module 33, to said third power supplying means 34 and to said third storage means 35, and configured to:

receive said first time instant $t_{1,1D}$ and said second time instant $t_{1,2D}$ from said first electronic device 1, as well as the time interval $\Delta t_D$, receive the values of said filtered angular velocity around the y axis $\omega_{2y}'$ by said second electronic device 2, as well as the respective time instants $t_{2y}'$ associated with each value of filtered angular velocity around the y axis $\omega_{2y}'$, calculate the mean value $\overline{\omega}_{2y}'$ of the filtered angular velocities around they axis associated with said second electronic device 2 at each instant of time $t_{2y}'$ within said time interval $\Delta t_D$, calculate an angle β between a first axis B1 passing through the centre O of the tyre 10 and said first contact point CP1, and a second axis B2 passing through the centre O of the tyre 10 said second contact point CP2, according to the following formula:

$$\beta = \overline{\omega}_{2y}' \cdot \Delta t_D,$$

calculate the length of the footprint of the tyre 10 with the following formula:

$$L = 2 \cdot R_0 \cdot \sin\frac{\beta}{2}$$

wherein $R_0$ is the rolling radius of the tyre 10.

As can be seen, the footprint length is substantially the measure of the length of the chord that subtends the angle between the first axis B1 (i.e., the axis passing through the centre of the tyre and the first point of contact CP1 between said tyre 10 and the ground) and the second axis B2 (i.e., the axis passing through the centre of the tyre and the second contact point CP2 between said portion of said tyre 10 and the ground).

FIG. 6 is a schematic view of a tyre 10, represented by a circumference having centre O and rolling radius $R_0$, in which the angle β is between the first axis B1 (passing through the centre of the tyre and the first contact point CP1) and the second axis B2 (passing through the centre of the tyre and the second contact point CP2).

As can be seen from FIG. 6, the length of the footprint of the tyre is approximated by the length of the chord which joins said first contact point CP1 and said second contact point CP2 and subtends said angle (delimited by the first axis B1 and the second axis B2).

Furthermore, said first electronic device 1 can be provided with a first clock source 16, connected to the first logic control unit 11, and said second electronic device 2 can be provided with a second clock source 26, connected to the second logic unit control 21, and said processing unit 3 can be provided with a third clock source 36, connected to the third logic control unit.

In a second embodiment being described, differently from the first embodiment, said first inertial measurement unit 12, included in the first electronic device 1, is configured for:

acquire, through said first accelerometer 122, at least a first linear acceleration along the z axis $A_{1z}$.

Consequently, the first control logic unit 11 is configured to:

receive from the first inertial measurement unit 12 of said first electronic device 1, the value of said at least one linear acceleration along the axis z $A_{1z}$, filter through a first digital filter the value of said at least one linear acceleration along the z axis $A_{1z}$ to obtain a filtered linear acceleration along the z axis $A_{1z}'$, identify a first instant of time $t_{1,1D}$, at a first point of contact CP1 between a portion of said tyre 10 and the ground, when said portion of said tyre 10 comes into contact with the ground, and a second instant of time $t_{1,2D}$, at a second contact point CP2 between said portion of said tyre 10 and the ground, but beyond which said portion of said tyre 10 loses contact with the ground, calculate the time interval $\Delta t_D$ between said first time instant $t_{1,1D}$ and said second time instant $t_{1,2D}$, store said first time instant $t_{1,1D}$ said second time instant $t_{1,2D}$ and said time interval $\Delta t_D$ in said first storage means 15, send said first time instant $t_{1,1D}$, said second time instant $t_{1,2D}$ and said time interval $\Delta t_D$ to said processing unit 3.

Figure 7A:
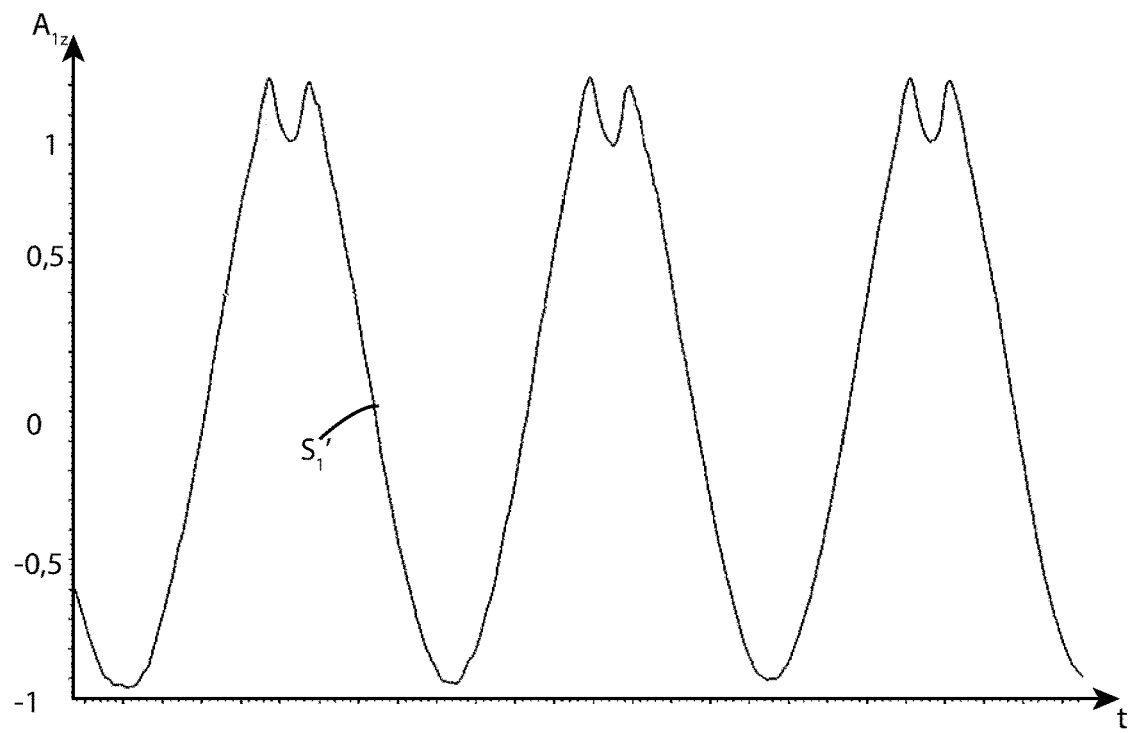
FIG. 7A shows on a Cartesian plane a sinusoid representing the linear acceleration along the z axis associated with the first electronic device, when the tyre is in use, where said sinusoid refers to a second embodiment of the system, object of the invention, in which the components of the system are the same components of the system of FIG. 2 (i.e., first electronic device, second electronic device and processing unit) and the length of the footprint is calculated on the basis of the information concerning said linear acceleration along the z axis.

FIG. 7A shows a sinusoid $S_1'$ which represents the linear acceleration along the z axis $A_{1z}$ associated with the first electronic device 1 (i.e., the electronic device arranged on the inner surface 10A of the tyre 10) in said second embodiment.

Said sinusoid $S_1'$ shows how the linear acceleration along the z axis $S_1'$ associated with the first electronic device 1 varies over time.

As can be seen from FIG. 7A, the sinusoid $S_1'$ periodically has a discontinuity due to a portion of said tyre 10 which first comes into contact with the ground and subsequently loses contact with the ground.

Figure 7B:
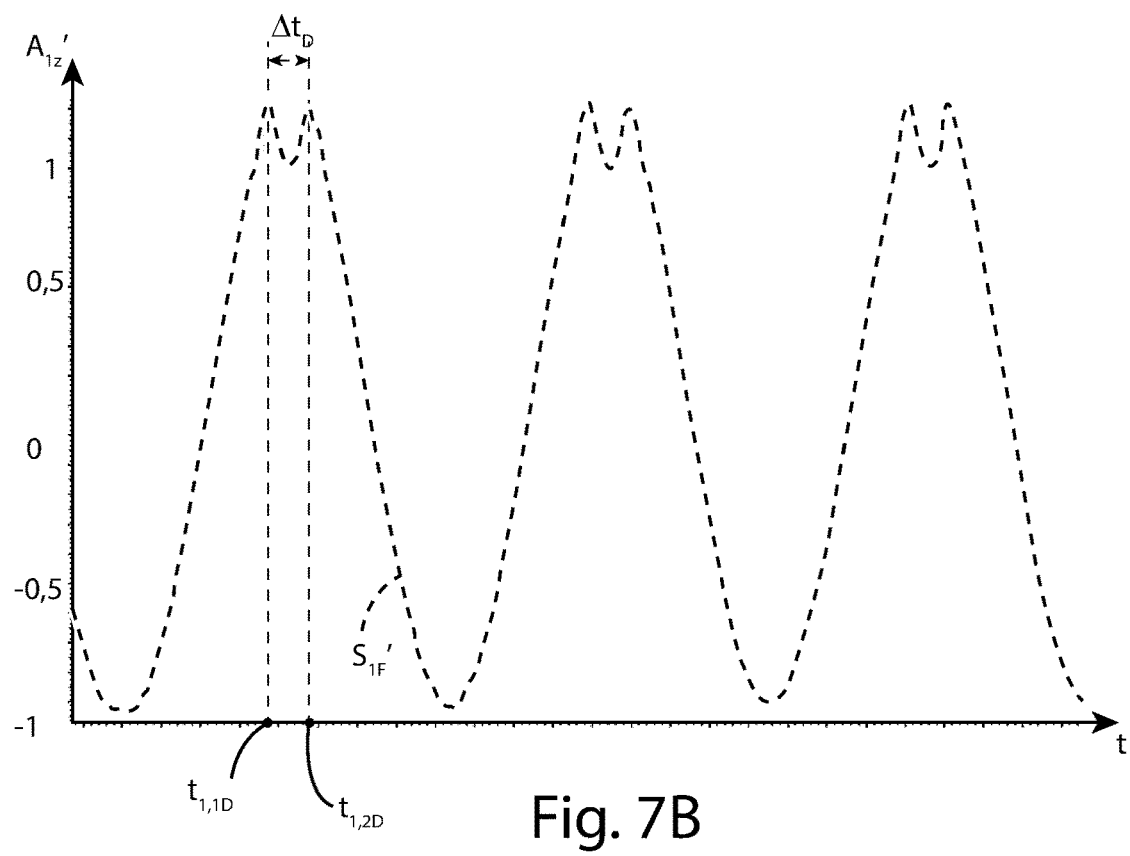
FIG. 7B shows on a Cartesian plane a sinusoid representing the linear acceleration along the z axis filtered by a first IIR filter, when the tyre is in use.

The sinusoid filtered by the first digital filter and indicated by $S_{1F}'$ in FIG. 7B has the same discontinuity in correspondence with a respective time interval $\Delta t_D$, although less pronounced than the sinusoid $S_1'$ (i.e., the sinusoid when the first filter digital has not been applied).

With reference to the second electronic device 2, the operation of said second electronic device 2 is the same operation as the second electronic device described for the first embodiment.

With reference to the processing unit 3, the operation of said processing unit 3 is the same as the operation of the processing unit 3 described for the first embodiment.

In a third embodiment, differently from the first embodiment and the second embodiment, the time interval $\Delta t_D$ between the first time instant $t_{1,1D}$ and the second time instant $t_{1,2D}$ is calculated by the value of the angular velocity around the y axis $\omega_{1y}$ associated with the first electronic device 1.

Consequently, the first control logic unit 11 is configured to:

receive from the first inertial measurement unit 12 of said first electronic device 1, the value of said angular velocity around the y axis $\omega_{1y}$, filter through said first digital filter the value of said angular velocity around the y axis $\omega_{1y}$, to obtain a filtered angular velocity around the y axis $\omega_{1y}'$, identify a first time instant of time $t_{1,1D}$, at a first contact point CP1 between a portion of said tyre 10 and the ground, when said portion of said tyre 10 comes into contact with the ground, and a second time instant $t_{1,2D}$, at a second contact point CP2 between said portion of said tyre 10 and the ground, but beyond which said portion of said tyre 10 loses contact with the ground, calculate the time interval $\Delta t_D$ between said first time instant $t_{1,1D}$ and said second time instant $t_{1,2D}$, store said first time instant $t_{1,1D}$, said second time instant $t_{1,2D}$ and said time interval $\Delta t_D$ in first said storage means 15, send said first time instant $t_{1,1D}$, said second time instant $t_{1,2D}$ and said time interval $\Delta t_D$ to said processing unit 3.

Figure 8A:
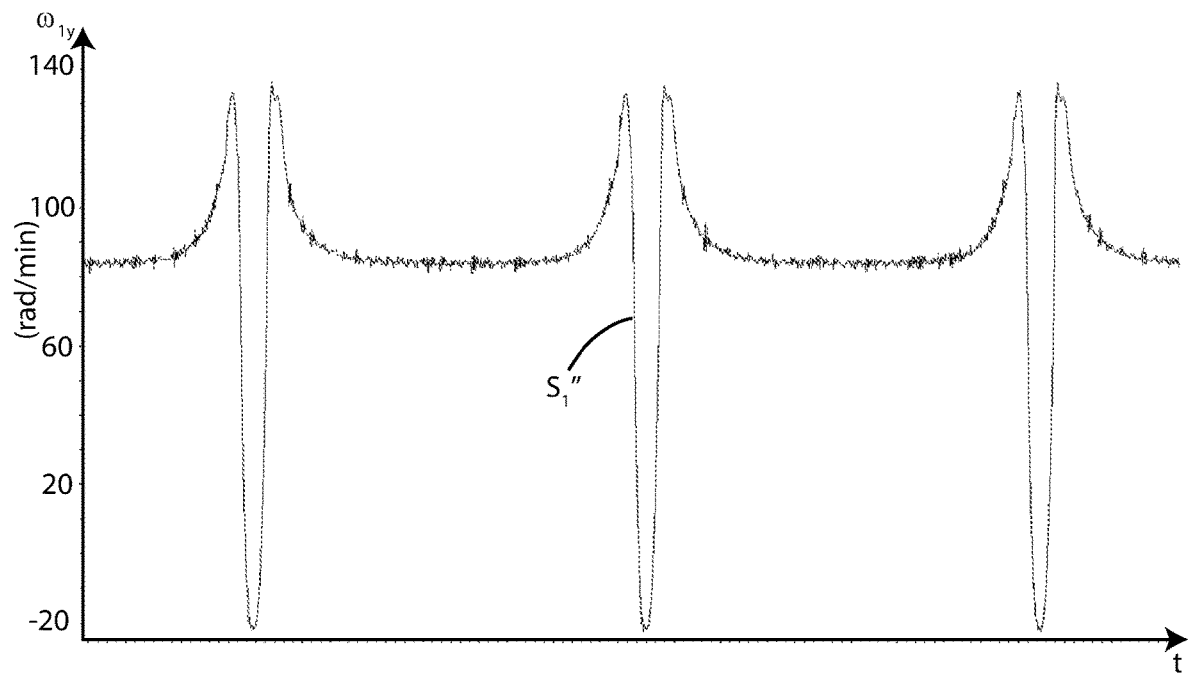
FIG. 8A shows on a Cartesian plane a sinusoid representing the angular velocity around the y axis associated with the first electronic device, when the tyre is in use, where said sinusoid refers to a third embodiment of the system, object of the invention, in which the components of the system are the same components of the system of FIG. 2 (i.e., first electronic device, second electronic device and processing unit) and the length of the footprint is calculated on the basis of the information concerning said angular velocity around the x axis.
Figure 8B:
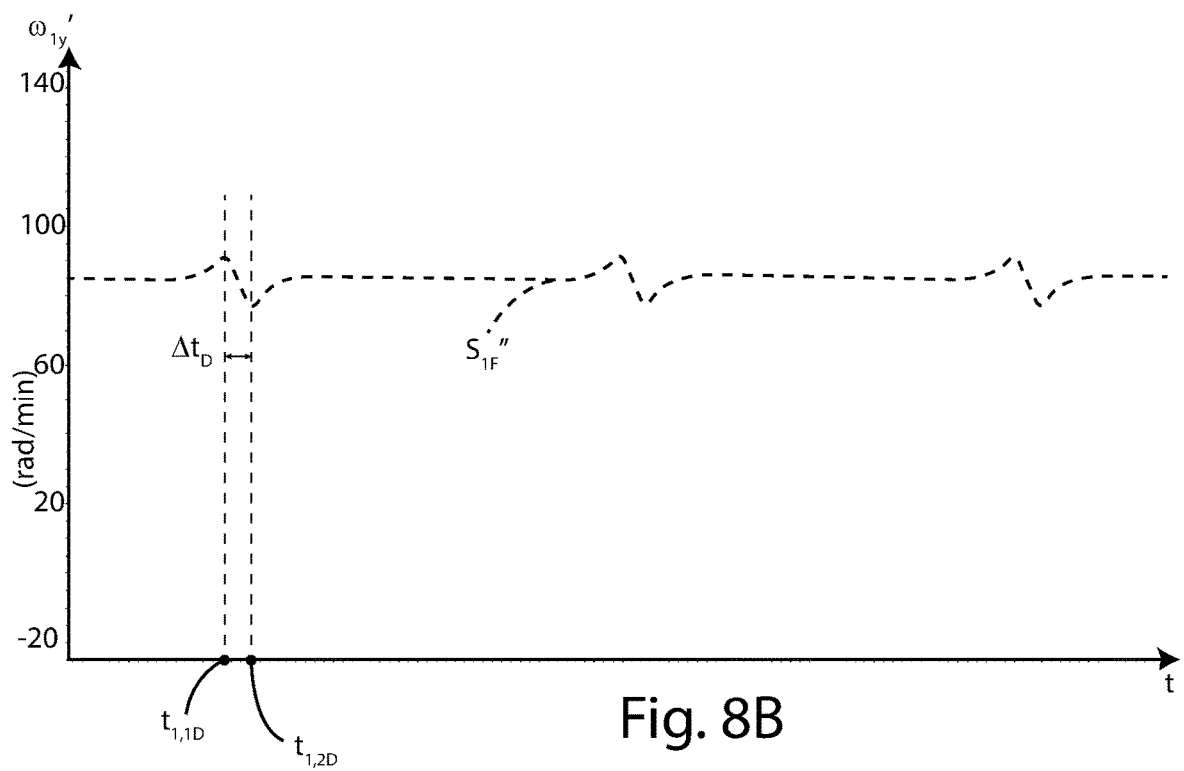
FIG. 8B shows on a Cartesian plane a sinusoid representing the angular velocity around the y axis filtered by a first IIR filter, when the tyre is in use.

FIGS. 8A and 8B show on a Cartesian plane a respective sinusoid $S_1''$, $S_{1F}''$ which represents the angular velocity around the y axis associated with the first electronic device 1 (in said third embodiment), respectively when the sinusoid is not filtered by a first digital filter and when the sinusoid is filtered by a first digital filter.

As can be seen from FIG. 8A, the sinusoid $S_1''$ periodically has a discontinuity due to a respective portion of the tyre 10 which first comes into contact with the ground and subsequently loses contact with the ground.

The sinusoid $S_{1F}''$ filtered by the first digital filter, shown in FIG. 8B, has the same discontinuity at a time interval $\Delta t_D$ although less pronounced than that of the sinusoid $S_1''$ (i.e., the sinusoid when the first digital filter has not been applied).

Said time interval $\Delta t_D$ is defined by a first time instant $t_{1,1D}$ in which the value of the angular velocity around the filtered y axis $\omega_{1y}'$ is maximum (indicated in FIG. 8B with $\omega_{MAX}$) and by a second time instant $t_{1,2D}$ in which the value of the filtered angular velocity around the x axis $\omega_{1x}'$ is minimum (indicated in FIG. 8B with $\omega_{MIN}$).

With reference to the second electronic device 2, the operation of said second electronic device 2 is the same operation as the second electronic device described for the first embodiment.

With reference to the processing unit 3, the operation of said processing unit 3 is the same as the operation of the processing unit 3 described for the first embodiment.

With reference to the three embodiments described above, the time interval $\Delta t_D$ is defined by a first time instant $t_{1,1D}$ and by a second time instant $t_{1,2D}$ which, based on the applied embodiment, can be:
- the initial instant time and the final time instant of a portion of discontinuity of a sinusoid $S_{1F}$ associated with the filtered linear acceleration along the x axis $A_{1x}'$ (see the first embodiment),
- the initial instant time and the final instant time of a portion of discontinuity of a sinusoid $S_{1F}''$ associated with the filtered linear acceleration along the z axis filtered $A_{1z}'$ (see the second embodiment),
- the initial instant time and the final instant time of a portion of discontinuity of a sinusoid $S_{1F}''$ associated with the filtered angular velocity around the y axis $\omega_{1y}'$ (see the third embodiment).

Furthermore, for each of the three embodiments described above, said third logic control unit 31 of the processing unit 3 can be configured to:
- send a synchronism signal to said first electronic device 1 and to said second electronic device 2 to synchronize the respective clock sources to the third clock source 36 of said processing unit 3, so that all clock sources are synchronous, according to a predetermined temporal resolution, which may be required by the circumstances.

It is preferable for said synchronism signal to be sent periodically, for example when the tyre 10 has completed a predetermined number of revolutions.

The sending of a synchronism signal is not necessary in the event that each of the electronic devices is configured only to send data to the processing unit 3 and the latter is configured to receive and process such data.

In the variant in which each electronic device 1, 2 is configured only to acquire, filter and send data to the processing unit 3 and the latter is configured to receive and process such data to calculate the length of the footprint, the first wireless transceiver module (arranged in the first electronic device 1) is replaced by a first wireless transmission module, the second wireless transceiver module (arranged in the second electronic device 2) is replaced by a second wireless transmission module and the third wireless transceiver module (arranged in the processing unit 3) is replaced by a wireless receiving module.

As is clear from the above, each electronic device 1, 2 can be configured to acquire and send data (after filtering them) and the processing unit 3 to receive and process such data to calculate the length of the footprint of the tyre or each electronic device 1, 2 can be configured to acquire and transmit data (after filtering them), as well as to receive one or more signals from the processing unit (such as for example a synchronism signal) and the processing unit 3 can be configured to receive and process such data to calculate the length of the footprint, as well as to send one or more signals to each of said electronic devices (such as for example a synchronism signal).

Furthermore, for each of the embodiments described above, the system can be consisted of a first electronic device 1, a second electronic device 2 and a processing unit 3.

Figure 9:
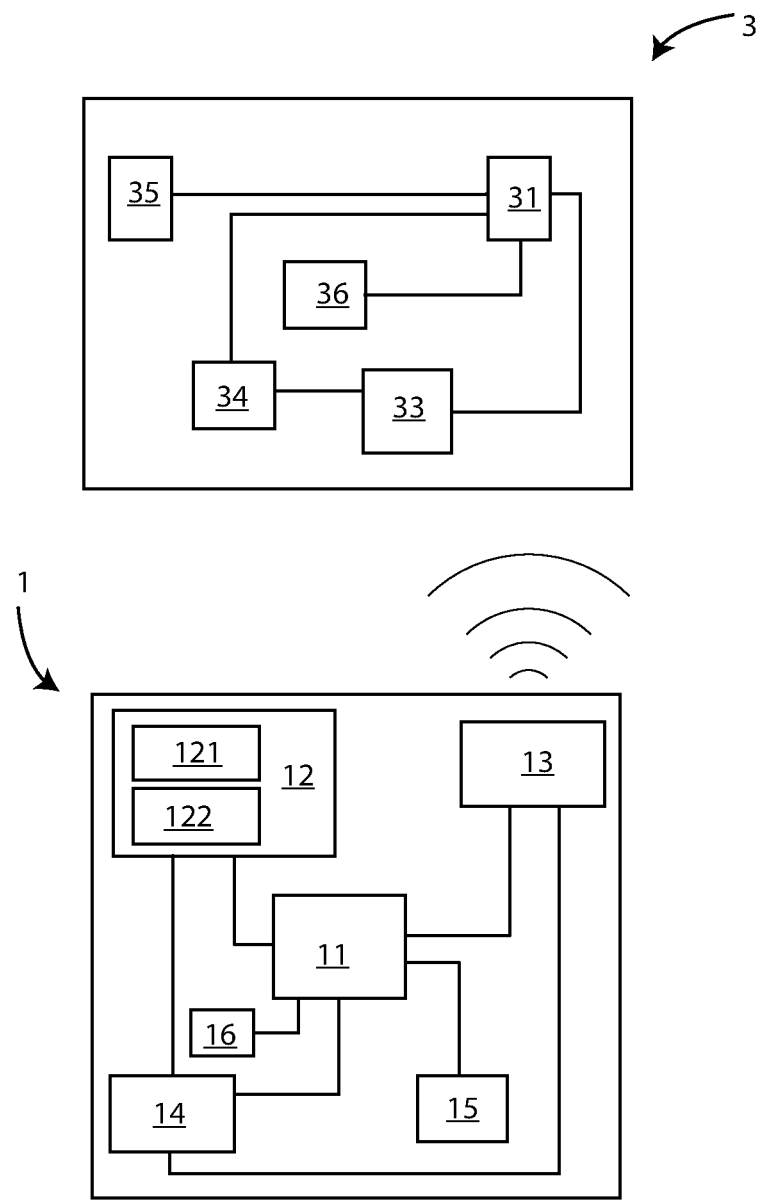
FIG. 9 is a schematic view of the components of a fourth embodiment of the system, object of the invention, comprising a first electronic device and a processing unit, external to said electronic device.

In a fourth embodiment, shown in FIG. 9, the system comprises a first electronic device 1 and a processing unit 3.

In this fourth embodiment, the second electronic device 2 coincides with the first electronic device 1, i.e., the electronic device arranged on the inner surface 10A of the tyre 10.

Therefore, the information on the time interval $\Delta t_D$ and on the angular velocity around the y axis are obtained through a single electronic device, i.e., the electronic device applied to the inner surface 10A of the tyre 10.

Therefore, differently from the three embodiments described above, in said fourth embodiment, the system comprises a single electronic device, i.e., only the first electronic device 1, arranged inside the tyre 10, and a processing unit 3, external to said first electronic device 1.

Said first electronic device 1 is configured to acquire and filter data and send signals/data to said processing unit 3 and the latter is configured to receive said signals/data and process such data.

Therefore, by means of said first electronic device 1 it is possible to identify the first time instant, the second time instant and calculate the time interval between said two time instants but also acquire the values of the angular velocity around the y axis associated with said first electronic device 1 and the respective time instants to calculate the angle β.

Consequently, the filtered angular velocity around the y axis $\omega_{2y}'$ which, in the previous embodiments, is associated with the second electronic device 2 is equal to the angular velocity around the filtered y axis $w_{1y}'$ which, in the previous embodiments, is associated with the first electronic device 1, the only electronic device in this fourth embodiment.

Hence, in the fourth embodiment the mean value $\overline{\omega}'_{2y}$ of the filtered angular velocities around the y axis (at each time instant within said time interval $\Delta t_D$) which, in the previous embodiments, is associated with the second electronic device 2 is equal to the mean value $\overline{\omega}'_{1y}$ of the filtered angular velocities around the y axis (at each time instant within said time interval $\Delta t_D$) associated with the first electronic device 1, the only electronic device in this embodiment.

Figure 10:
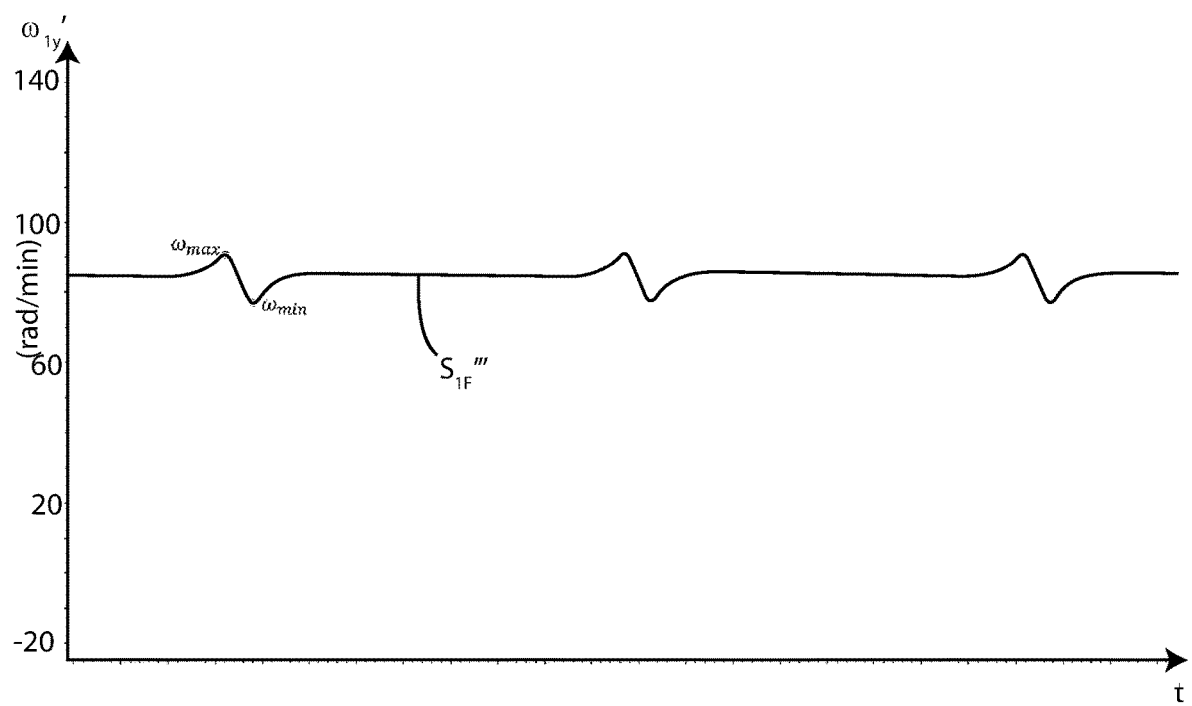
FIG. 10 shows on a Cartesian plane a sinusoid representing the angular velocity around the y axis filtered by a first IIR filter, when the tyre is in use.

FIG. 10 shows on a Cartesian plane a sinusoid $S_{1F}'''$ which represents the filtered angular velocity around the y axis $\omega_{1y}'$ of the first and only electronic device 1.

Similarly to the third embodiment, the sinusoid $S_{1F}'''$ filtered by the first digital filter, shown in FIG. 10, has a discontinuity in correspondence of a time interval $\Delta t_D$ defined by a first time instant $t_{1,1D}$ in which the value of the filtered angular velocity around the y axis $\omega_{1y}'$ is maximum (indicated in FIG. 10 with $\omega_{MAX}$) and by a second time instant $t_{1,2D}$ in which the value of the filtered angular velocity around the y axis $\omega_{1y}'$ is minimum (indicated in FIG. 10 with $\omega_{MIN}$).

In this fourth embodiment, the mean value $\overline{\omega}'_{1y}$ of the angular velocities around the y axis can be given by the sum of the maximum value and the minimum value of the angular velocity around the y axis, divided by the number 2.

With reference to FIG. 10, said mean value can be calculated with the following formula:

$$\overline{\omega}'_{1y} = \frac{\omega_{MAX} + \omega_{MIN}}{2}.$$

Alternatively, the system can be constituted by said first electronic device 1 and said processing unit 3.

Advantageously, with reference to said fourth embodiment, the structure of the system is a simplified structure with respect to the structure of the system described in the previous embodiments.

Furthermore, the energy consumption of said system is lower than the energy consumption of the systems described with reference to the previous embodiments.

With reference to the second embodiment (FIGS. 7A and 7B), to the third embodiment (FIGS. 8A and 8B) and to the fourth embodiment (FIGS. 9 and 10), is said first digital filter is a first IIR filter (Infinite Impulse Response), as mentioned for the first embodiment described above.

This is also evident from the wording of Figures (mentioned in Figure list) associated with the respective embodiments.

The present invention also refers to a method for measuring the length of a footprint of a tyre 10, by means of a system described above.

Said method comprises the following steps:

A) acquiring:
  a plurality of values associated with the linear acceleration along the x axis $A_{1x}$ associated with a first electronic device 1, or
  a plurality of values associated with the linear acceleration along the z axis $A_{1z}$ associated with a first electronic device 1, or
  a plurality of values associated with the angular velocity around they axis $\omega_{1y}$ associated with a first electronic device 1, B) filtering:
  each value of said linear acceleration along the x axis $A_{1x}$ to obtain a filtered linear acceleration along the x axis $A_{1x}'$, or
  each value of said linear acceleration along the z axis $A_{1z}$ to obtain a filtered linear acceleration along the z axis $A_{1z}'$, or
  each value of said angular velocity around the y axis $\omega_{1y}$ to obtain a filtered angular velocity around the y axis $\omega_{1y}'$, C) identifying a first time instant $t_{1,1D}$ at a first contact point CP1 between a portion of said tyre 10 and the ground, when said portion of said tyre 10 comes into contact with the ground, and a second time instant $t_{1,2D}$ at a second contact point CP2 between said portion of said tyre 10 and the ground, beyond which said portion of said tyre 10 loses contact with the ground; said first time instant $t_{1,1D}$ and said second time instant $t_{1,2D}$ being respectively:
  the initial time instant and the final time instant of a discontinuity portion of a sinusoid $S_{1F}$ associated with said filtered linear acceleration along the x axis $A_{1x}'$, or
  the initial time instant and the final time instant of a discontinuity portion of a sinusoid $S_{1F}'$ associated with said filtered linear acceleration along the z axis $A_{1z}'$, or
  the initial time instant and the final time instant of a discontinuity portion of a sinusoid $S_{1F}''$ associated with said filtered angular velocity around the y axis $\omega_{1y}'$, D) calculating the time interval $\Delta t_D$ between said first time instant $t_{1,1D}$ and said second time instant $t_{1,2D}$, E) storing said first time instant $t_{1,1D}$, second time instant $t_{1,2D}$ and said time interval $\Delta t_D$, F) acquiring a plurality of values associated with at least said angular velocity around the y axis $\omega_{2y}$ associated with the second electronic device 2, G) filtering each value of said angular velocity around the y axis $\omega_{2y}$ to obtain a respective filtered angular velocity around the y axis $\omega_{2y}'$, H) identifying a respective instant time $t_{2y}'$ associated with each value of said filtered angular velocity around the y axis $\omega_{2y}'$, I) storing in predetermined time intervals each value of said filtered angular velocity around the y axis $\omega_{2y}'$ and the respective time instant $t_{2y}'$, J) calculating the mean value $\overline{\omega}'_{2y}$ of the filtered angular velocities around the y axis associated with said second electronic device 2 in correspondence of each time instant $t_{2y}'$ within said time interval $\Delta t_D$, K) calculating an angle β arranged between a first axis B1 passing through the centre O of the tyre 10 and a first contact point CP1, and a second axis B2, passing through the centre O of the tyre 10 and a second contact point CP2, according to the following formula:

$$\beta = \overline{\omega}'_{2y} \cdot \Delta t_D,$$

L) calculating the length of the footprint of the tyre 10 with the following formula:

$$L = 2 \cdot R_0 \cdot \sin\frac{\beta}{2}$$

wherein $R_0$ is the rolling radius of the tyre 10.

With reference to the embodiments of the system described above, the acquired values will be values associated with the linear acceleration along the axis x $A_{1x}$ of the first electronic device 1 (see the first embodiment of the system) or the values associated with the linear acceleration along the z axis $A_{1z}$ of the first electronic device 1 (see the second embodiment of the system) or the values associated with the angular velocity around the y axis $\omega_{1y}$ of the first electronic device 1.

Consequently, the step of filtering and the step of identifying of the first time instant of time $t_{1,1D}$ and of the second time instant $t_{1,2D}$ to be used for calculating the time interval $\Delta t_D$ between said first time instant $t_{1,1D}$ and said second time instant $t_{1,2D}$ are performed on the values which have been acquired by means of one of the first three embodiments of the system described above.

In the fourth embodiment in which the second electronic device 2 coincides with the first electronic device 1, the step of identifying the first time instant and the second time instant, the step of calculating the time interval between said two time instants as well as the step of acquiring the values of the angular velocity around the y axis associated with the first electronic device 1 and the respective time instants to calculate the angle β are performed by a single electronic device, i.e., the first electronic device 1 and the same considerations already mentioned above with reference to this fourth embodiment.

Advantageously, as already mentioned, by means of the system and the method, object of the invention, it is possible to measure the length of a footprint of a tyre.

Consequently, it is possible to monitor the length of the footprint over time and if the value of the footprint length varies over time, for example due to a change in tyre pressure and/or the load acting on said tyre.

The present invention has been described for illustrative, but not limitative purposes, according to its preferred embodiments, but it is to be understood that variations and/or modifications can be carried out by a skilled in the art, without departing from the scope thereof, as defined according to enclosed claims.

The invention claimed is:

1. System for measuring a length of a footprint of a tyre (10), said system comprising:
   a first electronic device (1) to be positioned, in use, on an inner surface (10A) or on an outer surface (10B) of the tyre (10),
   a second electronic device (2), to be positioned, in use, in contact with a rim (20), on which said tyre (10) is mounted,
   a processing unit (3), external to said electronic devices (1, 2),
wherein:
   a first reference system $x_1$, $y_1$, $z_1$ is associated with the first electronic device (1) in such a way that an axis $x_1$ is tangent to a rotation of a first point (P1) which is a point of said tyre (10) in which said first electronic device (1) is applied, and an axis $z_1$ is perpendicular to said axis $x_1$,
   a second reference system $x_2$, $y_2$, $z_2$ is associated to the second electronic device (2) in such a way that an axis $x_2$ is tangent to a rotation of a second point (P2) which is a point of said rim (20) in which said second electronic device (2) is applied, and an axis $z_2$ is perpendicular to said axis $x_2$,
said first electronic device (1) is configured at least to send data to said processing unit (3) and comprises inside:
   a first inertial measurement unit (12) comprising a first gyroscope (121) and a first accelerometer (122), configured to acquire, by means of said first gyroscope (121), a plurality of values associated at least to an angular velocity around a y axis ($\omega_{1y}$), or, by means of said first accelerometer (122), a plurality of values associated at least to a linear acceleration along an x axis ($A_{1x}$) or a plurality of values associated at least to a linear acceleration along a z axis ($A_{1z}$),
   a first storage means (15) for storing data,
   a first logic control unit (11), connected with said first inertial measurement (12) and to said first storage means (15), and configured to:
      receive from said first inertial measurement unit (12):
         each value of said linear acceleration along the x axis ($A_{1x}$), or
         each value of said linear acceleration along the z axis ($A_{1z}$), or
         each value of said angular velocity around the y axis ($\omega_{1y}$),
      filter by means of a first digital filter:
         each value of said linear acceleration along the x axis ($A_{1x}$) to obtain a filtered linear acceleration along the x axis ($A_{1x}'$), or
         each value of said linear acceleration along the z axis ($A_{1z}$) to obtain a filtered linear acceleration along the z axis ($A_{1z}'$), or
         each value of said angular velocity around the y axis ($\omega_{1y}$) to obtain a filtered linear angular velocity around the y axis ($\omega_{1y}'$),
      identify a first time instant ($t_{1,1D}$), in correspondence of a first contact point (CP1) between a portion of said tyre (10) and a ground surface, when said portion of said tyre (10) comes into contact with the ground surface, and a second time instant ($t_{1,2D}$), in correspondence of a second contact point (CP2) between said portion of said tyre (10) and the ground surface, beyond which said portion of said tyre (10) loses contact with the ground surface; said first time instant ($t_{1,1D}$) and said second time instant ($t_{1,2D}$) being respectively:
         an initial time instant and a final time instant of a discontinuity portion of a sinusoid ($S_{1F}$) associated with said filtered linear acceleration along the x axis ($A_{1x}'$), or
         an initial time instant and a final time instant of a discontinuity portion of a sinusoid ($S_{1F}'$) associated with said filtered linear acceleration along the z axis ($A_{1z}'$), or
         an initial time instant and a final time instant of a discontinuity portion of a sinusoid ($S_{1F}''$) associated with said filtered angular velocity around the y axis ($\omega_{1y}'$),
      calculate a time interval ($\Delta t_D$) between said first time instant ($t_{1,1D}$) and said second time instant ($t_{1,2D}$),
      store said first time instant ($t_{1,1D}$), said second time instant ($t_{1,2D}$) and said time interval ($\Delta t_D$) in said first storage means (15),
      send said first time instant ($t_{1,1D}$), said second time instant ($t_{1,2D}$) and said time interval ($\Delta t_D$) to said processing unit (3),
said second electronic device (2) is configured at least to send data to said processing unit (3) and comprises inside:
   a second inertial measurement unit (22) comprising a second gyroscope (221), configured to acquire, by means of said second gyroscope (221), a plurality of values associated at least to an angular velocity around the y axis ($\omega_{2y}$),
   a second storage means (25) for storing data,
   a second logic control unit (21), connected to said second inertial measurement unit (22) and to said second storage means (25), and configured to:
      receive from the second inertial measurement unit (22) the values of said angular velocity around the y axis ($\omega_{2y}$),
      filter by means of a second digital filter each value of said angular velocity around the y axis ($\omega_{2y}$) to obtain a respective filtered angular velocity around the y axis ($\omega_{2y}'$),
      identify a respective time instant $t_{2y}'$ associated with each value of said filtered angular velocity around the y axis ($\omega_{2y}'$), store in predetermined time intervals in said second storage means (25) each value of said filtered angular velocity around the y axis ($\omega_{2y}'$) and the respective time instants, $t_{2y}'$, send to said processing unit (3) each value of said filtered angular velocity around the y axis ($\omega_{2y}'$) and the respective time instants $t_{2y}'$, said processing unit (3) is configured at least to receive data from said first electronic device (1) and from said second electronic device (2) and comprises inside:

a third storage means (35) for storing data, a third logic control unit (31), connected to said third storage means (35), and configured to:

receive said first time instant ($t_{1,1D}$), said second time instant ($t_{1,1D}$) and said time interval ($\Delta t_D$) from said first electronic device (1), receive the values of said filtered angular velocity around the y axis ($\omega_{2y}'$) sent by said second electronic device (2), as well as the respective time instants $t_{2y}'$, calculate a mean value ($\overline{\omega}'_{2y}$) of the filtered angular velocities around the y axis associated with said second electronic device (2) in correspondence of each of the respective time instants $t_{2y}'$ that are within said time interval ($\Delta t_D$), calculate an angle (B) between a first axis (B1) passing through a centre (O) of the tyre (10) and said first contact point (CP1) and a second axis (B2) passing through the centre (O) of the tyre (10) and said second contact point (CP2), according to the following formula:

$$\beta = \overline{\omega}'_{2y} \cdot \Delta t_D,$$

calculate the length (L) of the footprint of the tyre (10) with the following formula:

$$L = 2 \cdot R_0 \cdot \sin\frac{\beta}{2}$$

wherein $R_0$ is a rolling radius of the tyre (10).

2. System according to claim 1, characterized in that:

the first logic control unit (11) of said first electronic device (1) is configured to send said time interval ($\Delta t_D$) to the processing unit (3), when the tyre (10) has completed a predetermined first number of revolutions, and in that:

the second logic control unit (21) of said second electronic device (2) is configured to send to the processing unit (3) the values of said filtered angular velocity around the y axis ($\omega_{2y}'$) and the respective time instants $t_{2y}'$, when the tyre (10) has completed a predetermined second number of revolutions.

3. System according to claim 2, characterized in that:

said first digital filter is a first Infinite Impulse Response (IIR) filter; said first IIR filter having preferably a frequency between 0.1 Hz and 1 Hz, and in that:

said second digital filter is a second IIR filter; said second IIR filter having preferably a frequency between 0.1 Hz and 1 Hz.

4. System according to claim 2, characterized in that:

said first electronic device (1) is configured to receive one or more signals from said processing unit (3) and is provided with a first clock source (16), connected to the first logic control unit (11), said second electronic device (2) is configured to receive one or more signals from said processing unit (3) and is provided with a second clock source (26), connected to the second logic control unit (21), and said processing unit (3) is configured to send one or more signals to each of said electronic devices (1, 2) and is provided with a third clock source (36), said third clock source (36) being connected to said third control logic unit (31), and in that:

said third control logic unit (31) is configured to send a synchronism signal to said first electronic device (1) and to said second electronic device (2) to synchronize said first clock source (16) and said second clock source (26) to the third clock source (36).

5. System according to claim 2, characterized in that said second electronic device (2) coincides with said first electronic device (1), so that the value of the filtered angular velocity around the y axis ($\omega_{2y}'$) of the second electronic device (2) coincides with the value of the filtered angular velocity around the y axis ($\omega_{1y}'$) of the first electronic device (1) and that the mean value ($\overline{\omega}'_{2y}$) of the filtered angular velocities associated with said second electronic device (2) in correspondence of each time instant within said time interval ($\Delta t_D$) coincides with the mean value ($\overline{\omega}'_{1y}$) of the filtered angular velocities associated with said first electronic device (1) in correspondence of each time instant within said time interval ($\Delta t_D$).

6. System according to claim 2, characterized in that said time interval ($\Delta t_D$) is defined by a first time instant ($t_{1,1D}$) in which the value of the filtered angular velocity around the y axis ($\omega_{1y}'$) is maximum and a second time instant ($t_{1,2D}$) in which the value of the filtered angular velocity around the y axis ($\omega_{1y}'$) is minimum and the mean value of the angular velocities ($\overline{\omega}'_{1y}$) is given by a sum of said maximum value and of said minimum value, divided by number 2.

7. System according to claim 1, characterized in that:

said first digital filter is a first Infinite Impulse Response (IIR) filter; said first IIR filter having preferably a frequency between 0.1 Hz and 1 Hz, and in that:

said second digital filter is a second IIR filter; said second IIR filter having preferably a frequency between 0.1 Hz and 1 Hz.

8. System according to claim 7, characterized in that:

said first electronic device (1) is configured to receive one or more signals from said processing unit (3) and is provided with a first clock source (16), connected to the first logic control unit (11), said second electronic device (2) is configured to receive one or more signals from said processing unit (3) and is provided with a second clock source (26), connected to the second logic control unit (21), and said processing unit (3) is configured to send one or more signals to each of said electronic devices (1, 2) and is provided with a third clock source (36), said third clock source (36) being connected to said third control logic unit (31), and in that:

said third control logic unit (31) is configured to send a synchronism signal to said first electronic device (1) and to said second electronic device (2) to synchronize said first clock source (16) and said second clock source (26) to the third clock source (36).

9. System according to claim 7, characterized in that said second electronic device (2) coincides with said first electronic device (1), so that the value of the filtered angular velocity around the y axis ($\omega_{2y}'$) of the second electronic device (2) coincides with the value of the filtered angular velocity around the y axis ($\omega_{1y}'$) of the first electronic device (1) and that the mean value ($\overline{\omega}'_{2y}$) of the filtered angular velocities associated with said second electronic device (2) in correspondence of each time instant within said time interval ($\Delta t_D$) coincides with the mean value ($\omega'_{1y}$) of the filtered angular velocities associated with said first electronic device (1) in correspondence of each time instant within said time interval ($\Delta t_D$).

10. System according to claim 7, characterized in that said time interval ($\Delta t_D$) is defined by a first time instant ($t_{1,1D}$) in which the value of the filtered angular velocity around the y axis ($\omega_{1y}'$) is maximum and a second time instant ($t_{1,2D}$) in which the value of the filtered angular velocity around the y axis ($\omega_{1y}'$) is minimum and the mean value of the angular velocities ($\overline{\omega}'_{1y}$) is given by a sum of said maximum value and of said minimum value, divided by number 2.

11. System according to claim 1, characterized in that:
said first electronic device (1) is configured to receive one or more signals from said processing unit (3) and is provided with a first clock source (16), connected to the first logic control unit (11),
said second electronic device (2) is configured to receive one or more signals from said processing unit (3) and is provided with a second clock source (26), connected to the second logic control unit (21), and
said processing unit (3) is configured to send one or more signals to each of said electronic devices (1, 2) and is provided with a third clock source (36), said third clock source (36) being connected to said third control logic unit (31),
and in that:
said third control logic unit (31) is configured to
send a synchronism signal to said first electronic device (1) and to said second electronic device (2) to synchronize said first clock source (16) and said second clock source (26) to the third clock source (36).

12. System according to claim 11, characterized in that the third logic control unit (31) of said processing unit (3) is configured to send said synchronism signal, when the tyre (10) has completed a predetermined number of revolutions.

13. System according to claim 12, characterized in that said second electronic device (2) coincides with said first electronic device (1), so that the value of the filtered angular velocity around the y axis ($\omega_{2y}'$) of the second electronic device (2) coincides with the value of the filtered angular velocity around the y axis ($\omega_{1y}'$) of the first electronic device (1) and that the mean value ($\overline{\omega}'_{2y}$) of the filtered angular velocities associated with said second electronic device (2) in correspondence of each time instant within said time interval ($\Delta t_D$) coincides with the mean value ($\omega'_{1y}$) of the filtered angular velocities associated with said first electronic device (1) in correspondence of each time instant within said time interval ($\Delta t_D$).

14. System according to claim 11, characterized in that said second electronic device (2) coincides with said first electronic device (1), so that the value of the filtered angular velocity around the y axis ($\omega_{2y}'$) of the second electronic device (2) coincides with the value of the filtered angular velocity around the y axis ($\omega_{1y}'$) of the first electronic device (1) and that the mean value ($\overline{\omega}'_{2y}$) of the filtered angular velocities associated with said second electronic device (2) in correspondence of each time instant within said time interval ($\Delta t_D$) coincides with the mean value ($\overline{\omega}'_{1y}$) of the filtered angular velocities associated with said first electronic device (1) in correspondence of each time instant within said time interval ($\Delta t_D$).

15. System according to claim 1, characterized in that said second electronic device (2) coincides with said first electronic device (1), so that the value of the filtered angular velocity around the y axis ($\omega_{2y}'$) of the second electronic device (2) coincides with the value of the filtered angular velocity around the y axis ($\omega_{1y}'$) of the first electronic device (1) and that the mean value ($\omega'_{2y}$) of the filtered angular velocities associated with said second electronic device (2) in correspondence of each time instant within said time interval ($\Delta t_D$) coincides with the mean value ($\overline{\omega}'_{1y}$) of the filtered angular velocities associated with said first electronic device (1) in correspondence of each time instant within said time interval ($\Delta t_D$).

16. System according claim 1, characterized in that said time interval ($\Delta t_D$) is defined by a first time instant ($t_{1,1D}$) in which the value of the filtered angular velocity around the y axis ($\omega_{1y}'$) is maximum and a second time instant ($t_{1,2D}$) in which the value of the filtered angular velocity around the y axis ($\omega_{1y}'$) is minimum and the mean value of the angular velocities ($\overline{\omega}'_{1y}$) is given by a sum of said maximum value and of said minimum value, divided by number 2.

17. Method for measuring a length of a footprint of a tyre (10), by means of a system including:
a first logic control unit (11) of a first electronic device (1) that is configured to send a time interval ($\Delta t_D$) to a processing unit (3) when the tyre (10) has completed a predetermined first number of revolutions, the first electronic device (1) being positioned on an inner surface (10A) or an outer surface (10B) of the tyre (10); and
a second logic control unit (21) of a second electronic device (2) that is configured to send to the processing unit (3) values of an angular velocity around a y axis ($\omega_{2y}'$) and respective time instants ($t_{2y}'$) when the tyre (10) has completed a predetermined second number of revolutions, the second electronic device (2) being positioned on a rim (20) on which the tyre (10) is mounted;
the method comprising the following steps:
A) acquiring:
a plurality of values associated with a linear acceleration along an x axis ($A_{1x}$) associated with the first electronic device (1), or
a plurality of values associated with a linear acceleration along a z axis ($A_{1z}$) associated with the first electronic device (1), or
a plurality of values associated with an angular velocity around a y axis ($\omega_{1y}$) associated with the first electronic device (1),
B) filtering:
each value of said linear acceleration along the x axis ($A_{1x}$) to obtain a filtered linear acceleration along an x axis ($A_{1x}'$), or each value of said linear acceleration along the z axis ($A_{1z}$) to obtain a filtered linear acceleration along a z axis ($A_{1z}'$), or
each value of said angular velocity around the y axis ($\omega_{1y}$) to obtain a filtered angular velocity around a y axis ($\omega_{1y}'$),
C) identifying a first time instant ($t_{1,1D}$), at a first contact point (CP1) between a portion of said tyre (10) and a ground surface, when said portion of said tyre (10) comes into contact with the ground surface, and a second time instant ($t_{1,2D}$), at a second contact point (CP2) between said portion of said tyre (10) and the ground surface, beyond which said portion of said tyre

(10) loses contact with the ground surface; said first time instant ($t_{1,1D}$) and said second time instant ($t_{1,2D}$) being respectively:

an initial time instant and a final time instant of a discontinuity portion of a sinusoid ($S_{1F}$) associated with said filtered linear acceleration along the x axis ($A_{1x}'$), or an initial time instant and a final time instant of a discontinuity portion of a sinusoid ($S_{1F}'$) associated with said filtered linear acceleration along the z axis ($A_{1z}'$), or an initial time instant and a final time instant of a discontinuity portion of a sinusoid ($S_{1F}''$) associated with said filtered angular velocity around the y axis ($\omega_{1y}'$), D) calculating, at the processing unit (3), the time interval ($\Delta t_D$) between said first time instant ($t_{1,1D}$) and said second time instant ($t_{1,2D}$) in response to the first electronic device (1) sending the time interval ($\Delta t_D$) to the processing unit (3) upon determining that the tyre (10) has completed the predetermined first number of revolutions, E) storing said first time instant ($t_{1,1D}$), second time instant ($t_{1,2D}$) and said time interval ($\Delta t_D$), F) acquiring a plurality of values associated with at least said angular velocity around the y axis ($\omega_{2y}$) associated with the second electronic device (2) at the processing unit (3) in response to the second electronic device (2) sending the angular velocity around the y axis ($\omega_{2y}$) to the processing unit (3) upon determining that the tyre (10) has completed the predetermined second number of revolutions, G) filtering each value of said angular velocity around the y axis ($\omega_{2y}$) to obtain a respective filtered angular velocity around the y axis ($\omega_{2y}'$), H) identifying the respective time instant ($t_{2y}'$) associated with each value of said filtered angular velocity around the y axis ($\omega_{2y}'$) in response to the second electronic device (2) sending the respective time instant ($t_{2y}'$) to the processing unit (3) upon determining that the tyre (10) has completed the predetermined second number of revolutions, I) storing in predetermined time intervals each value of said filtered angular velocity around the y axis ($\omega_{2y}'$) and the respective time instants ($t_{2y}'$), J) calculating a mean value ($\bar{\omega}'_{2y}$) of the filtered angular velocities around the y axis associated with said second electronic device (2) in correspondence of each time instant ($t_{2y}'$) within said time interval ($\Delta t_D$), K) calculating an angle (B) arranged between a first axis (B1) passing through a centre (O) of the tyre (10) and said first contact point (CP1), and a second axis (B2), passing through the centre (O) of the tyre (10) and said second contact point (CP2), according to the following formula:

$$\beta = \bar{\omega}'_{2y} \cdot \Delta t_D,$$

L) calculating, via the processing unit (3), the length (L) of the footprint of the tyre (10) with the following formula:

$$L = 2 \cdot R_0 \cdot \sin\frac{\beta}{2}$$

wherein $R_0$ is a rolling radius of the tyre (10).

18. Method for measuring a length of a footprint of a tyre (10), by means of a system including:

a first electronic device (1) positioned on an inner surface (10A) or an outer surface (10B) of the tyre (10), the first electronic device including a first digital filter that is a first Infinite Impulse Response (IIR) filter having a frequency between 0.1 Hz and 1 Hz;

a second electronic device (2) positioned on a rim (20) on which the tyre (10) is mounted, the second electronic device (2) including a second digital filter that is a second IIR filter having a frequency between 0.1 Hz and 1 Hz;

the method comprising the following steps:

A) acquiring:

a plurality of values associated with a linear acceleration along an x axis ($A_{1x}$) associated with a first electronic device (1), or a plurality of values associated with a linear acceleration along a z axis ($A_{1z}$) associated with the first electronic device (1), or a plurality of values associated with an angular velocity around a y axis ($\omega_{1y}$) associated with the first electronic device (1), B) filtering:

each value of said linear acceleration along the x axis ($A_{1x}$) to obtain a filtered linear acceleration along an x axis ($A_{1x}'$), or each value of said linear acceleration along the z axis ($A_{1z}$) to obtain a filtered linear acceleration along a z axis ($A_{1z}'$), or each value of said angular velocity around the y axis ($\omega_{1y}$) to obtain a filtered angular velocity around a y axis ($\omega_{1y}'$), C) identifying a first time instant ($t_{1,1D}$), at a first contact point (CP1) between a portion of said tyre (10) and a ground surface, when said portion of said tyre (10) comes into contact with the ground surface, and a second time instant ($t_{1,2D}$), at a second contact point (CP2) between said portion of said tyre (10) and the ground surface, beyond which said portion of said tyre (10) loses contact with the ground surface; said first time instant ($t_{1,1D}$) and said second time instant ($t_{1,2D}$) being respectively:

an initial time instant and a final time instant of a discontinuity portion of a sinusoid ($S_{1F}$) associated with said filtered linear acceleration along the x axis ($A_{1x}'$), or an initial time instant and a final time instant of a discontinuity portion of a sinusoid ($S_{1F}'$) associated with said filtered linear acceleration along the z axis ($A_{1z}'$), or an initial time instant and a final time instant of a discontinuity portion of a sinusoid ($S_{1F}''$) associated with said filtered angular velocity around the y axis ($\omega_{1y}'$), D) calculating a time interval ($\Delta t_D$) between said first time instant ($t_{1,1D}$) and said second time instant ($t_{1,2D}$) in response to the first electronic device (1) sending the time interval ($\Delta t_D$) upon determining that the tyre (10) has completed a predetermined first number of revolutions, E) storing said first time instant ($t_{1,1D}$), second time instant ($t_{1,2D}$) and said time interval ($\Delta t_D$), F) acquiring a plurality of values associated with at least said angular velocity around a y axis ($\omega_{2y}$) associated with a second electronic device (2) in response to the second electronic device (2) sending said angular velocity around the y axis ($\omega_{2y}$) upon determining that the tyre (10) has completed a predetermined second number of revolutions, G) filtering each value of said angular velocity around the y axis ($\omega_{2y}$) to obtain a respective filtered angular velocity around a y axis ($\omega_{2y}'$), H) identifying a respective time instant ($t_{2y}'$) associated with each value of said filtered angular velocity around the y axis ($\omega_{2y}'$) in response to the second electronic device (2) sending the respective time instant ($t_{2y}'$) upon determining that the tyre (10) has completed the predetermined second number of revolutions, I) storing in predetermined time intervals each value of said filtered angular velocity around the y axis ($\omega_{2y}'$) and the respective time instants ($t_{2y}'$), J) calculating a mean value ($\bar{\omega}_{2y}'$) of the filtered angular velocities around the y axis associated with said second electronic device (2) in correspondence of each time instant ($t_{2y}'$) within said time interval ($\Delta t_D$), K) calculating an angle (B) arranged between a first axis (B1) passing through a centre (O) of the tyre (10) and said first contact point (CP1), and a second axis (B2), passing through the centre (O) of the tyre (10) and said second contact point (CP2), according to the following formula:

$$\beta = \bar{\omega}_{2y}' \cdot \Delta t_D,$$

L) calculating the length (L) of the footprint of the tyre (10) with the following formula:

$$L = 2 \cdot R_0 \cdot \sin\frac{\beta}{2}$$

wherein $R_0$ is a rolling radius of the tyre (10).

* * * * *